(12) United States Patent
Messina et al.

(10) Patent No.: US 12,406,303 B2
(45) Date of Patent: *Sep. 2, 2025

(54) SYSTEMS AND METHODS FOR USING ORDER MODIFIERS IN RELATION TO TRADING STRATEGIES

(71) Applicant: TRADING TECHNOLOGIES INTERNATIONAL INC., Chicago, IL (US)

(72) Inventors: Patricia A. Messina, Chicago, IL (US); Bharat Mittal, Schaumburg, IL (US)

(73) Assignee: TRADING TECHNOLOGIES INTERNATIONAL, INC., Chicago, IL (US)

( * ) Notice: Subject to any disclaimer, the term of this patent is extended or adjusted under 35 U.S.C. 154(b) by 319 days.

This patent is subject to a terminal disclaimer.

(21) Appl. No.: 18/345,145

(22) Filed: Jun. 30, 2023

(65) Prior Publication Data

US 2023/0351508 A1 Nov. 2, 2023

Related U.S. Application Data

(63) Continuation of application No. 17/667,074, filed on Feb. 8, 2022, now Pat. No. 11,741,544, which is a continuation of application No. 17/012,679, filed on Sep. 4, 2020, now Pat. No. 11,295,385, which is a continuation of application No. 15/977,614, filed on May 11, 2018, now Pat. No. 10,796,365, which is a continuation of application No. 14/053,930, filed on
(Continued)

(51) Int. Cl.
*G06Q 40/04* (2012.01)
*G06Q 40/06* (2012.01)

(52) U.S. Cl.
CPC .............. *G06Q 40/04* (2013.01); *G06Q 40/06* (2013.01)

(58) Field of Classification Search
CPC ....................................................... G06Q 40/04
See application file for complete search history.

(56) References Cited

U.S. PATENT DOCUMENTS

| 6,772,132 B1 | 8/2004 | Kemp, II et al. |
| 7,243,083 B2 | 7/2007 | Burns et al. |
| (Continued) | | |

OTHER PUBLICATIONS

Optimal trade execution: an evolutionary approach, IEEE (Year: 2005).*

(Continued)

*Primary Examiner* — Bruce I Ebersman
(74) *Attorney, Agent, or Firm* — McDonnell Boehnen Hulbert & Berghoff LLP

(57) ABSTRACT

A quantity modifier and a price modifier are provided for a spread trading strategy having a desired spread price and a desired spread quantity. According to an example embodiment, a quantity modifier divides the desired spread quantity into a plurality of disclosed spread quantities. Once the disclosed quantities are determined, a plurality of disclosed spread orders having the disclosed spread quantities are sequentially submitted to the market until the full desired spread order quantity is executed or until a predefined condition is detected. A price modifier determines a price level for each disclosed spread quantity, such that each disclosed spread order may be submitted at a different price level.

20 Claims, 15 Drawing Sheets

Related U.S. Application Data

Oct. 15, 2013, now Pat. No. 9,996,877, which is a continuation of application No. 12/570,816, filed on Sep. 30, 2009, now Pat. No. 8,589,278.

(56) References Cited

U.S. PATENT DOCUMENTS

| | | | |
|---|---|---|---|
| 7,571,134 B1 | 8/2009 | Burns et al. | |
| 7,577,600 B1 | 8/2009 | Zagara et al. | |
| 7,593,879 B2* | 9/2009 | Glinberg | G06Q 40/00 705/36 R |
| 7,644,030 B2* | 1/2010 | Burns | G06Q 40/00 705/37 |
| 7,672,896 B2 | 3/2010 | Burns et al. | |
| 7,693,777 B1* | 4/2010 | Holmes | G06Q 40/04 705/37 |
| 7,742,976 B1* | 6/2010 | Burns | G06Q 40/04 705/37 |
| 7,774,261 B1 | 8/2010 | Mintz et al. | |
| 7,774,262 B1* | 8/2010 | Mintz | G06Q 40/00 705/37 |
| 7,831,505 B2* | 11/2010 | Herz | G06Q 40/00 705/37 |
| 7,890,412 B2* | 2/2011 | Morano | G06Q 40/04 705/37 |
| 8,255,305 B2* | 8/2012 | Milne | G06Q 40/04 705/38 |
| 8,386,368 B2* | 2/2013 | Rooney | G06Q 40/04 705/37 |
| 8,433,640 B2* | 4/2013 | Rooney | G06Q 40/04 705/37 |
| 8,589,278 B2* | 11/2013 | Messina | G06Q 40/04 705/37 |
| 8,682,781 B1* | 3/2014 | Messina | G06Q 40/04 705/37 |
| 9,996,877 B2 | 6/2018 | Messina et al. | |
| 10,796,365 B2 | 10/2020 | Messina et al. | |
| 10,853,877 B2* | 12/2020 | Brianti | G06Q 40/06 |
| 10,853,878 B2* | 12/2020 | Haller | G06Q 40/04 |
| 11,080,789 B1* | 8/2021 | Guzman | G06Q 40/06 |
| 11,295,385 B2 | 4/2022 | Messina et al. | |
| 2008/0162378 A1* | 7/2008 | Levine | G06Q 40/04 705/37 |
| 2008/0201249 A1* | 8/2008 | Speth | G06Q 40/04 705/35 |
| 2008/0288391 A1* | 11/2008 | Downs | G06Q 40/04 705/37 |
| 2008/0301062 A1* | 12/2008 | Glinberg | G06Q 40/04 705/36 R |
| 2009/0182658 A1* | 7/2009 | Lutnick | G06Q 40/00 705/37 |
| 2010/0076906 A1* | 3/2010 | Eubank | G06Q 40/06 705/37 |
| 2010/0076907 A1* | 3/2010 | Rosenthal | G06Q 40/04 705/37 |
| 2010/0205081 A1* | 8/2010 | Holmes | G06Q 40/04 705/37 |
| 2010/0293110 A1* | 11/2010 | Rosenthal | G06Q 40/06 715/788 |
| 2011/0040668 A1 | 2/2011 | Lee et al. | |
| 2011/0040669 A1* | 2/2011 | Lee | G06Q 40/04 705/37 |
| 2011/0055113 A1* | 3/2011 | Cunningham | G06Q 40/06 705/37 |
| 2011/0066536 A1* | 3/2011 | Milne | G06Q 40/04 705/37 |
| 2011/0078064 A1 | 3/2011 | Messina et al. | |
| 2011/0145126 A1* | 6/2011 | Rooney | G06Q 40/04 705/37 |
| 2014/0040110 A1 | 2/2014 | Messina et al. | |
| 2018/0260898 A1 | 9/2018 | Messina et al. | |
| 2021/0056631 A1 | 2/2021 | Messina et al. | |

OTHER PUBLICATIONS

The Penn-Lehman automated trading project, IEEE (Year: 2003).*
Alam, Z. et al., "Strategic Order Splitting and the Demand / Supply of Liquidity", J. Mack Robinson college of Business, Georgia State University, Atlanta, Nov. 19, 2009 [retrieved from internet on Nov. 1, 2016].
Extended European Search Report of European Application No. 10821043.6 dated May 17, 2013 (mailed May 28, 2013).
Hendershott, T., Electronic Trading in Financial Markets (Year: 2003).
International Search Report and the Written Opinion from International Application No. PCT/US10/49627 dated Nov. 18, 2010.
Search and Examination Report of Singapore Patent Application No. 201201783-6 dated Feb. 13, 2013 (mailed Jun. 4, 2013).
Search and Examination Report of Singapore Patent Application No. 201307200-4, dated Aug. 17, 2015 (mailed Sep. 23, 2015).

* cited by examiner

700

|   | Exch | Status | B/S | Qty | Product | Contract | Price | TIF | Modifier | Exec Q | Wrk Qty |
|---|------|--------|-----|-----|---------|----------|-------|-----|----------|--------|---------|
| 1 | TTA  | Wrk    | B   | 2   | AutoSpr |          |       |     | Reload   | 0      | 2       |
| 2 | ABC  | Pos R  | B   | 10  | FESX    | Jun09    |       |     |          | 0      | 0       |
| 3 | ABC  | Wrk    | B   | 5   | FESX    | Jun09    | 12.0  |     |          | 0      | 5       |
| 4 | ABC  | Wrk    | S   | 3   | FESX    | Sep09    | 14.0  |     |          | 0      | 3       |
| 5 | ABC  | Pos R  | S   | 6   | FESX    | Sep09    |       |     |          | 0      | 0       |

FIG. 7

|   | Exch | Status | B/S | Qty | Product | Contract | Price | TIF | Modifier | Exec Q | Wrk Qty |   |
|---|------|--------|-----|-----|---------|----------|-------|-----|----------|--------|---------|---|
| 1 | TTA  | Wrk    | B   | 2   | AutoSpr |          |       |     | Reload   | 0      | 1       |   |
| 2 | ABC  | Pos R  | B   | 5   | FESX    | Jun09    |       |     |          | 0      | 0       |   |
| 3 | ABC  | Wrk    | B   | 5   | FESX    | Jun09    | 11.0  |     |          | 0      | 5       |   |
| 4 | ABC  | Wrk    | S   | 3   | FESX    | Sep09    | 15.0  |     |          | 0      | 3       |   |
| 5 | ABC  | Pos R  | S   | 3   | FESX    | Sep09    |       |     |          | 0      | 0       |   |

FIG. 10

| Action | Leg A | Leg B | |
|---|---|---|---|
| Add Order | 5-lot Q<br>15-lot PR | 3-lot Q<br>9-lot PR | 1202 |
| Leg A Quoting Filled | | | 1204 |
| Send Hedge on B<br>Adjust PR of B | 15-lot PR | 3-lot Q<br>6-lot PR<br>3-lot H | 1206 |
| Spread Fill 1 (LegB Hedge Filled) | | | 1208 |
| Adjust PR of A | 5-lot Q<br>10-lot PR | 3-lot Q<br>6-lot PR | 1210 |
| Leg A Quoting Filled | | | 1212 |
| Send Hedge on B<br>Adjust PR of B | 10-lot PR | 3-lot Q<br>3-lot PR<br>3-lot H | 1214 |
| Spread Fill 2 (LegB Hedge Filled) | | | 1216 |
| Adjust PR of A | 5-lot Q<br>5-lot PR | 3-lot Q<br>3-lot PR | 1218 |
| Leg A Quoting Filled | | | 1220 |
| Send Hedge on B<br>Delete Quoting Ord B<br>Delete PR of B | 5-lot PR | 3-lot H | 1222 |
| OK of B Delete<br>Delete PR of A | | 3-lot H | 1224 |
| Spread Fill 3 (LegB Hedge Filled) | | | 1226 |

FIG. 12

| Action | Leg A | Leg B | |
|---|---|---|---|
| Add Order | 15-lot Q<br>15-lot PR | 9-lot Q<br>9-lot PR | 1302 |
| Leg A Quoting Filled | | | 1304 |
| Send Hedge on B<br>Reduce Quoting Qty B<br>Adjust PR of B | 10-lot Q<br>15-lot PR | 6-lot Q<br>6-lot PR<br>3-lot H | 1306 |
| OK of B Qty Change<br>Adjust PR of A | 10-lot Q<br>10-lot PR | 6-lot Q<br>6-lot PR<br>3-lot H | 1308 |
| Spread Fill 1 (LegB Hedge Filled) | | | 1310 |
|  | 10-lot Q<br>10-lot PR | 6-lot Q<br>6-lot PR | 1312 |
| Leg A Quoting Filled | | | 1314 |
| Send Hedge on B<br>Reduce Quoting Qty B<br>Adjust PR of B | 5-lot Q<br>15-lot PR | 3-lot Q<br>3-lot PR<br>3-lot H | 1316 |
| OK of B Qty Change<br>Adjust PR of B | 5-lot Q<br>5-lot PR | 3-lot Q<br>3-lot PR<br>3-lot H | 1318 |
| Spread Fill 2 (LegB Hedge Filled) | | | 1320 |
|  | 5-lot Q<br>5-lot PR | 3-lot Q<br>3-lot PR | 1322 |
| Leg A Quoting Filled | | | 1324 |
| Send Hedge on B<br>Reduce Quoting Qty B<br>Adjust PR of B | 5-lot PR | 3-lot H | 1326 |
| OK of B Delete<br>Delete PR of A |  | 3-lot H | 1328 |
| Spread Fill 3 (LegB Hedge Filled) | | | 1330 |

FIG. 13

SYSTEMS AND METHODS FOR USING ORDER MODIFIERS IN RELATION TO TRADING STRATEGIES

CROSS-REFERENCE TO RELATED APPLICATIONS

The present application is a continuation of U.S. patent application Ser. No. 17/667,074, which is a continuation of U.S. patent application Ser. No. 17/012,679, Sep. 4, 2020, now U.S. Pat. No. 11,295,385, which is a continuation of U.S. patent application Ser. No. 15/977,614, filed May 11, 2018, now U.S. Pat. No. 10,796,365, which is a continuation of U.S. patent application Ser. No. 14/053,930, filed Oct. 15, 2013, now U.S. Pat. No. 9,996,877, which is a continuation of U.S. patent application Ser. No. 12/570,816, filed Sep. 30, 2009, now U.S. Pat. No. 8,589,278, entitled "SYSTEM AND METHOD FOR USING ORDER MODIFIERS IN RELATION TO TRADING STRATEGIES," the contents of each of which are fully incorporated herein by reference for all purposes.

BACKGROUND

The present invention is directed towards electronic trading systems. More particularly, certain embodiments of the present invention are directed towards using order modifiers for trading strategies, such as spreads, in electronic trading systems.

An electronic trading system provides for electronically matching orders to buy and sell items to be traded. The items may include, for example, stocks, options, and commodities. Typically, an electronic exchange in the electronic trading system is used to match the orders. In addition, the electronic exchange provides market data to various client devices in the electronic trading system used by traders to place the orders. For example, the electronic exchange may provide market data such as prices for various items available for trading and trade confirmations indicating what trades have occurred at what quantities and/or prices.

In addition to trading single items, a trader may trade more than one item according to a trading strategy. One common trading strategy is a spread, and trading according to a spread trading strategy may also be referred to as spread trading. Spread trading may attempt to capitalize on changes or movements in the relationships between the items in the trading strategy, for example.

A trading strategy may define a relationship between two or more items to be traded, as well as a desired price at which to buy or sell the trading strategy. Each item in a trading strategy may be referred to as a leg of the trading strategy. Then, an automated trading tool, for example, attempts to achieve the desired price by buying and selling the legs at appropriate prices. The leg for which the order is placed is referred to as the quoting leg. The other leg is referred to as a lean leg and/or a hedge leg. The price that the quoting leg is quoted at is based on a price (often an inside market price) that an order could be filled at in the hedge leg. The price of the hedge leg is also known as the lean price (also referred to as a leaned on price). As the lean price changes, the quoting price may also change to achieve a desired spread price.

Traders often define multiple trading strategies, such as spreads, at different desired prices to achieve a certain average desired price. To do that, at least one leg order is quoted (depending on the trading strategy configuration) for each trading strategy, thus, resulting in multiple orders working in the market at the same time. Such a configuration requires a lot of processing power by an automated trading tool, because to achieve the desired price for each trading strategy, the quoting order corresponding to each respective trading strategy may have to be re-quoted when the lean price changes. Additionally, when placing so many orders to achieve a desired average price, the existing risk management systems typically allocate enough risk to cover all orders that are quoted and all possible hedge orders. In such a system, a trader may quickly exceed his risk limits. Because a significant risk position is taken up by the orders being quoted in relation to each trading strategy, the risk system may prevent a trader from sending additional orders or executing other trading strategies.

Additionally, if a trader places a spread order with all spread legs being quoted, the trader risks all quoted leg orders getting filled at the same time, thus creating undesirable spread fills. For example, if a trader places a 10-lot spread order having two legs, with both legs being quoted, it is possible for the trader to actually get 20 spread fills if the two quoted leg orders get filled at the same time. The number of undesirable spread fills increases as the quantity quoted for the spread and/or the number of legs increases.

It is therefore desirable for electronic trading systems to offer tools that can assist a trader in adapting his or her trading strategy to an electronic marketplace, help the trader make trades at desirable prices, while making sure that enough risk balance exists to execute desired trading strategies.

SUMMARY

Various embodiments that are described herein include systems and methods for trading a spread trading strategy in an electronic trading environment. According to an example embodiment, a spread is defined at a computing device to send a spread order to an electronic exchange. The defined spread includes a desired spread quantity, a desired spread price, a quantity modifier, and a price modifier, among other parameters. Two or more disclosed spread orders may be determined using the quantity modifier and the price modifier. More specifically, the quantity modifier may be used to divide the desired spread quantity into a plurality of disclosed spread quantities. Once the disclosed quantities are determined, a plurality of disclosed spread orders having the disclosed quantities are sequentially submitted to the market until the full desired spread order quantity is executed or until a predefined condition is detected. The price modifier is used to determine a price level for each disclosed spread quantity, such that each disclosed spread order may be submitted at a different price level.

BRIEF DESCRIPTION OF THE DRAWINGS

Example embodiments are described herein with reference to the following drawings.

FIG. 7 illustrates an example order book interface that reflects the currently pending spread orders using spread modifiers;

FIG. 10 illustrates an updated order book;

FIG. 12 illustrates a processing flow for order placement and risk allocation for a spread using spread modifiers according to one example embodiment;

FIG. 13 illustrates a processing flow for order placement and risk allocation for a spread not using spread modifiers according to one example embodiment;

Figure 1:
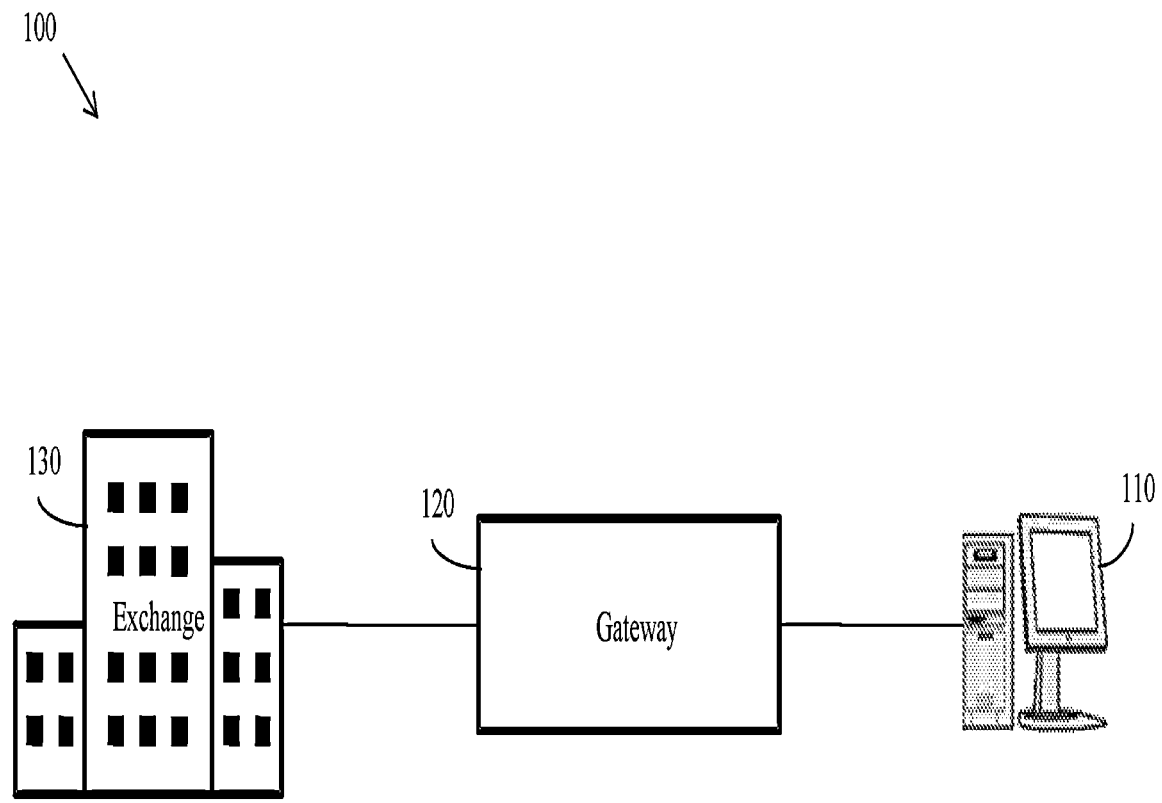
FIG. 1 illustrates an electronic trading system in which certain embodiments of the present invention may be employed.

The foregoing summary, as well as the following detailed description, will be better understood when read in conjunction with the drawings which show certain embodiments of the present invention. The drawings are for the purpose of illustrating certain embodiments, but it should be understood that the present invention is not limited to the arrangements and instrumentality shown in the drawings.

DETAILED DESCRIPTION

Certain embodiments of the present invention provide one or more order modifiers in relation to a trading strategy having a desired price and a desired quantity. According to one example embodiment, a quantity modifier and a price modifier are provided for a spread trading strategy having a desired spread price and a desired spread quantity. More specifically, when a spread order is submitted, the desired spread quantity is modified based on the spread quantity modifier to determine a first disclosed desired spread quantity.

According to an example embodiment, the desired spread quantity is modified such that only a portion of the desired spread quantity is executed at the desired spread price. When a complete spread unit for the first disclosed desired spread quantity is executed, another spread order having a second disclosed desired spread quantity is generated using the spread quantity modifier. According to an example embodiment, the second disclosed desired spread quantity is submitted at a modified desired spread price that is determined using the predefined price modifier, such as an offset amount that is applied to the desired spread price. Once a complete spread unit for the second disclosed desired spread quantity is achieved, additional spread orders having modified desired spread quantities and modified spread prices may be submitted until the desired spread quantity for the spread is executed or until a specific event is detected.

As will be described in greater detail below, there are many advantages of using orders modifiers described herein. First, when order modifiers are applied to a trading strategy, a trader's market exposure is lower, as lower order quantities are submitted to the market. Additionally, lower risk resources are allocated to execute such a trading strategy, thus, allowing the remaining risk balance to be used in relation to other trading strategies that a trader wishes to trade.

I. Example Electronic Trading System

FIG. 1 illustrates an electronic trading system 100 in which certain embodiments of the present invention may be employed. The system 100 includes a client device 110, a gateway 120, and an electronic exchange 130. The client device 110 is in communication with the gateway 120. The gateway 120 is in communication with the exchange 130.

In operation, the client device 110 may be utilized by a user to send orders to buy or sell tradeable objects at the exchange 130. The orders are sent through the gateway 120 to the exchange 130. In addition, market data is sent from the exchange 130 through the gateway 120 to the client device 110. The user may also utilize the client device 110 to monitor this market data and base a decision to send an order for a tradeable object on the market data.

A tradeable object is anything which can be traded with a quantity and/or a price. For example, financial products such as stocks, options, bonds, futures, currency, warrants, funds derivatives, commodities, traded events, goods, and collections and/or combinations of these may be tradeable objects. A tradeable object may be "real" or "synthetic." A real tradeable object includes products that are listed by an exchange. A synthetic tradeable object includes products that are defined by the user and are not listed by an exchange. For example, a synthetic tradeable object may include a combination of real (or other synthetic) products such as a synthetic spread created by a trader utilizing a client device 110.

The client device 110 may include one or more electronic computing platforms such as a hand-held device, laptop, desktop computer, workstation with a single or multi-core processor, server with multiple processors, and/or cluster of computers, for example.

The client device 110 may include one or more trading applications. The trading application(s) may process market data by arranging and displaying the market data in trading and charting windows. This processing may be based on user preferences. The trading application(s) may include an automated trading tool such as an automated spread trading tool.

The client device 110 may include an electronic trading workstation, a portable trading device, an algorithmic trading or "black-box" system, an embedded trading system, and/or an automated trading tool, for example. The client device 110 may be a computing system running a copy of X_TRADER™, an electronic trading platform provided by Trading Technologies International, Inc. of Chicago, Illinois. As another example, the client device 110 may be a computing device running the automated trading tool, Autospreader™, also provided by Trading Technologies International, Inc.

The client device 110 is adapted to send orders to buy or sell tradeable objects. The client device 110 may also be adapted to cancel orders, change orders, and/or query an exchange.

The orders sent by the client device 110 may be sent at the request from a user or automatically from the computer. For example, a trader may utilize an electronic trading workstation to place an order for a particular tradeable object, manually providing various parameters for the order such as an order price and/or quantity. As another example, an automated trading tool may calculate one or more parameters for an order and automatically send the order. In some instances, an automated trading tool may prepare the order to be sent but not actually send it without confirmation from the user.

In certain embodiments, the client device 110 includes a user interface. The user interface may include one or more display devices for presenting a text-based or graphical interface of a trading application to a user. For example, the display devices may include computer monitors, hand-held device displays, projectors, and/or televisions. The user interface may be used by the user to specify or review parameters for an order using a trading application. The user interface may include one or more input devices for receiving input from a user, for example. The input devices may include a keyboard, trackball, two or three-button mouse, and/or touch screen. The user interface may include other devices for interacting with a user, and information may be aurally provided to a user through a speaker and/or received through a microphone.

In certain embodiments, the orders from the client device 110 are sent to the exchange 130 through the gateway 120. The client device 110 may communicate with the gateway 120 using a local area network, a wide area network, a virtual private network, a T1 line, a T3 line, an ISDN line, a point-of-presence, and/or the Internet, as well as different connection types.

The gateway 120 is adapted to communicate with the client device 110 and the exchange 130. The gateway 120 facilitates communication between the client device 110 and the exchange 130. For example, the gateway 120 may receive orders from the client device 110 and transmit the orders to the exchange 130. As another example, the gateway 120 may receive market data from the exchange 130 and transmit the market data to the client device 110.

In certain embodiments, the gateway 120 performs processing on data communicated between the client device 110 and the exchange 130. For example, the gateway 120 may process an order received from the client device 110 into a data format acceptable by the exchange 130. Similarly, the gateway 120 may transform market data in an exchange-specific format received from the exchange 130 into a format understood by the client device 110. The processing of the gateway 120 may also include tracking orders from the client device 110 and updating the status of the order based on fill confirmations received from the exchange 130. As another example, the gateway 120 may coalesce market data from the exchange 130 and provide it to the client device 120.

In certain embodiments, the gateway 120 provides services other than processing data communicated between the client device 110 and the exchange 130. For example, the gateway 120 may provide risk processing.

The gateway 120 may include one or more electronic computing platforms such as a hand-held device, laptop, desktop computer, workstation with a single or multi-core processor, server with multiple processors, and/or cluster of computers.

The gateway 120 may include one or more gateway applications. The gateway application(s) may, for example, handle order processing and market data processing. This processing may be based on user preferences.

In certain embodiments, the gateway 120 communicates with the exchange 130 using a local area network, a wide area network, a virtual private network, a T1 line, a T3 line, an ISDN line, a point-of-presence, and/or the Internet, or other connection types.

The exchange 130 is adapted to match orders to buy and sell tradeable objects. The tradeable objects may be listed for trading by the exchange 130. The orders may include orders received from the client device 110, for example. Orders may be received from the client device 110 through the gateway 120. In addition, the orders may be received from other devices in communication with the exchange 130. That is, typically the exchange 130 will be in communication with a variety of other client devices (which may be similar to client device 110) that also provide orders to be matched.

The exchange 130 is adapted to provide market data. The market data may be provided to the client device 110 through the gateway 120. The market data may include data that represents the inside market, for example. The inside market is the lowest sell price (also referred to as the "best ask") and the highest buy price (also referred to as the "best bid") at a particular point in time. The market data may also include market depth. Market depth refers to the quantities available at the inside market and may also refer to quantities available at other prices away from the inside market. Thus, the inside market may be considered the first level of market depth. One tick away from the inside market may be considered the second level of market depth, for example. In certain embodiments, market depth is provided for all price levels. In certain embodiments, market depth is provided for less than all price levels. For example, market depth may be provided only for the first five price levels on either side of the inside market. The market data may also include information such as the last traded price (LTP), the last traded quantity (LTQ), and order fill information.

In certain embodiments, the system 100 includes more than one client device 110. For example, multiple client devices similar to the client device 110, discussed above, may be in communication with the gateway 120 to send orders to the exchange 130.

In certain embodiments, the system 100 includes more than one gateway 120. Multiple gateways similar to the gateway 120, discussed above, may be in communication with the client device 110 and the exchange 130. Such an arrangement may be used to provide redundancy should one gateway 120 fail, for example.

In certain embodiments, the system 100 includes more than one exchange 130. The gateway 120 may be in communication with multiple exchanges similar to the exchange 130, discussed above. Such an arrangement may allow the client device 110 to trade at more than one exchange through the gateway 120, for example. Alternatively, multiple gateways could be used, with each gateway assigned to a specific exchange.

In certain embodiments, the client device 110 includes one or more computing devices or processing components. In other words, the functionality of the client device 110 may be performed by more than one computing device. For example, one computing device may generate orders to be sent to the exchange 130 while another computing device may provide a graphical user interface to a trader. In certain embodiments, the gateway 120 includes one or more computing devices or processing components. In other words, the functionality of the gateway 120 may be performed by more than one computing device. In certain embodiments, the exchange 130 includes one or more computing devices or processing components. In other words, the functionality of the exchange 130 may be performed by more than one computing device.

In certain embodiments, the gateway 120 is part of the client device 110, and the components of the gateway 120 may be part of the same computing platform as the client device 110. As another example, the functionality of the gateway 120 may be performed by components of the client device 110. In certain embodiments, the gateway 120 is not present. Such an arrangement may occur when the client device 110 does not need to utilize the gateway 120 to communicate with the exchange 130, such as when the client device 110 has been adapted to communicate directly with the exchange 130.

In certain embodiments, the gateway 120 is physically located at the same site as the client device 110. In certain embodiments, the gateway 120 is physically located at the same site as the exchange 130. In certain embodiments, the client device 110 is physically located at the same site as the exchange 130. In certain embodiments, the gateway 120 is physically located at a site separate from both the client device 110 and the exchange 130.

While not shown for the sake of clarity, in certain embodiments, the system 100 may include other devices that are specific to the communications architecture such as middleware, firewalls, hubs, switches, routers, exchange-specific communication equipment, modems, security managers, and/or encryption/decryption devices.

Figure 2:
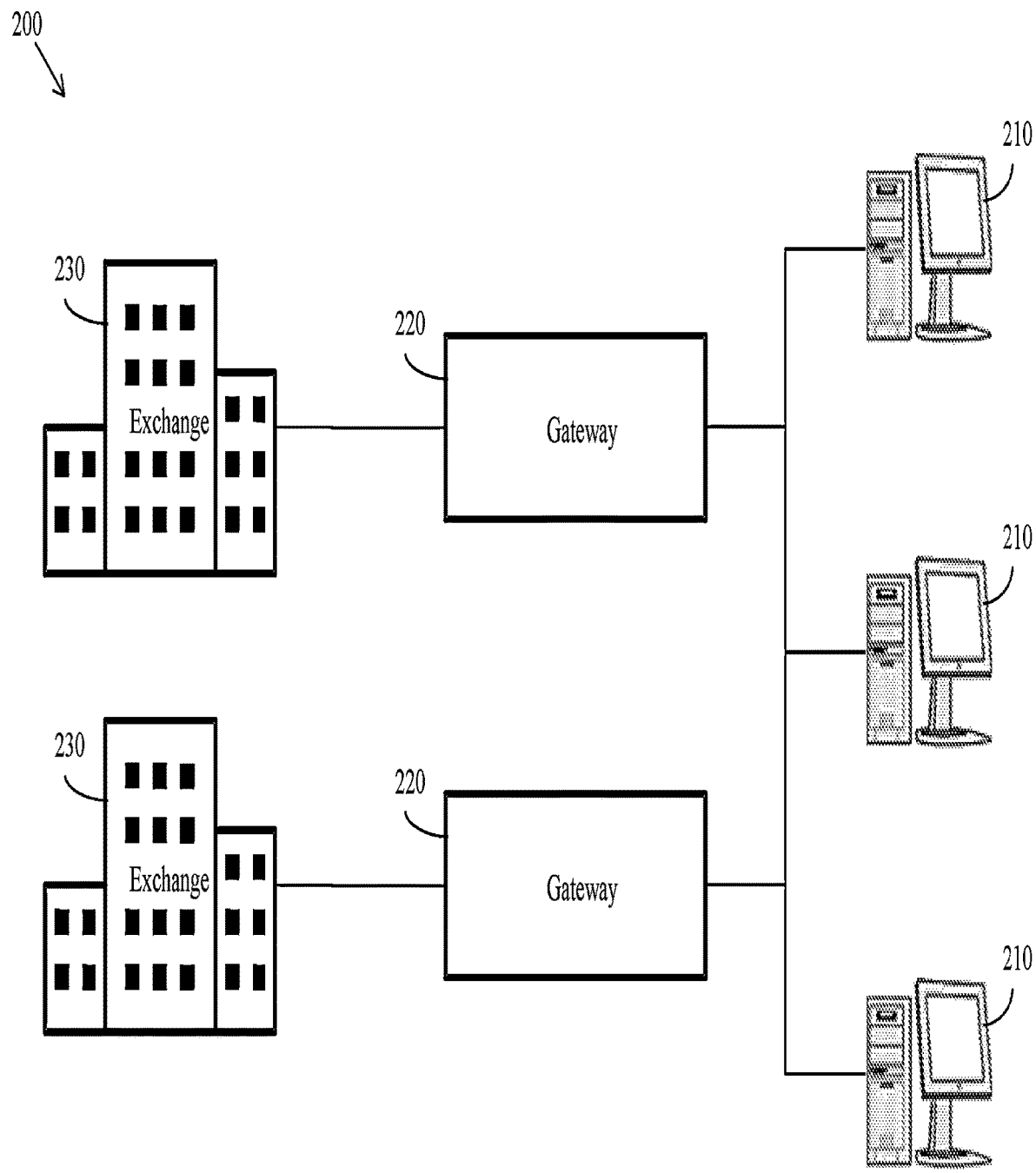
FIG. 2 illustrates an electronic trading system in which certain embodiments of the present invention may be employed.

FIG. 2 illustrates an electronic trading system 200 in which certain embodiments of the present invention may be employed. The system 200 includes one or more client devices 210, one or more gateways 220, and one or more electronic exchanges 230. The client devices 210 are in communication with one or more of the gateways 220. Each gateway 220 is in communication with a corresponding exchange 230.

One or more of the client devices 210 may be similar to the client device 110, discussed above, for example. One or more of the gateways 220 may be similar to the gateway 120, discussed above, for example. One or more of the exchanges 230 may be similar to the exchange 130, discussed above, for example.

In operation, a client device 210 may be utilized by a user to send orders to buy or sell tradeable objects listed at different exchanges 230. The orders are sent through one or more of the gateways 220 to one or more of the exchanges 230. In addition, market data is sent from the exchanges 230 through the gateways 220 to one or more of the client devices 210. The user may also utilize a client device 210 to monitor this market data and base a decision to send an order for a tradeable object on the market data.

In certain embodiments, a client device 210 is in communication with one of the gateways 220. In certain embodiments, a client device 210 is in communication with more than one of the exchanges 230.

In certain embodiments, a gateway 220 is in communication with one of the exchanges 230. In certain embodiments, a gateway 220 is in communication with more than one of the exchanges 230.

In certain embodiments, a client device 210 is adapted to communicate directly with one or more of the exchanges 230 and does not utilize a gateway 220.

The components, elements, and/or functionality of the systems 100 and/or 200 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM, for execution on a general purpose computer or other processing device.

II. Strategy Trading

As mentioned above, in addition to trading a single tradeable object by itself, a trader may trade more than one tradeable object according to a trading strategy. One common trading strategy is a spread. Trading a spread, or "spread trading," attempts to capitalize on changes or movements in the relationships between the tradeable object in the trading strategy, for example.

A trader may utilize an automated trading tool to trade according to a trading strategy. For example, the automated trading tool may be Autospreader™ provided by Trading Technologies International, Inc. of Chicago, Illinois.

A trading strategy defines a relationship between two or more tradeable objects to be traded. Each tradeable object being traded as part of a trading strategy may be referred to as a leg or outright market of the trading strategy.

When the trading strategy is to be bought, the definition for the trading strategy specifies which tradeable object corresponding to each leg should be bought or sold. Similarly, when the trading strategy is to be sold, the definition specifies which tradeable objects corresponding to each leg should be bought or sold. For example, a trading strategy may be defined such that buying the trading strategy involves buying one unit of a first tradeable object for leg A and selling one unit of a second tradeable object for leg B. Selling the trading strategy typically involves performing the opposite actions for each leg.

In addition, the definition for the trading strategy may specify a spread ratio associated with each leg of the trading strategy. The spread ratio may also be referred to as an order size for the leg. The spread ratio indicates the quantity of each leg in relation to the other legs. For example, a trading strategy may be defined such that buying the trading strategy involves buying 2 units of a first tradeable object for leg A and selling 3 units of a second tradeable object for leg B. The sign of the spread ratio may be used to indicate whether the leg is to be bought (the spread ratio is positive) or sold (the spread ratio is negative) when buying the trading strategy. In the example above, the spread ratio associated with leg A would be "2" and the spread ratio associated with leg B would be "−3."

In some instances, the spread ratio may be implied or implicit. For example, the spread ratio for a leg of a trading strategy may not be explicitly specified, but rather implied or defaulted to be "1" or "−1."

Additionally, the definition for the trading strategy may specify a multiplier associated with each leg of the trading strategy. The multiplier is used to adjust the price of the particular leg for determining the price of the spread. The multiplier for each leg may be the same as the spread ratio. For example, in the example above, the multiplier associated with leg A may be "2" and the multiplier associated with leg B may be "−3," both of which match the corresponding spread ratio for each leg. Alternatively, the multiplier associated with one or more legs may be different than the corresponding spread ratios for those legs. For example, the values for the multipliers may be selected to convert the prices for the legs into a common currency.

Figure 3:
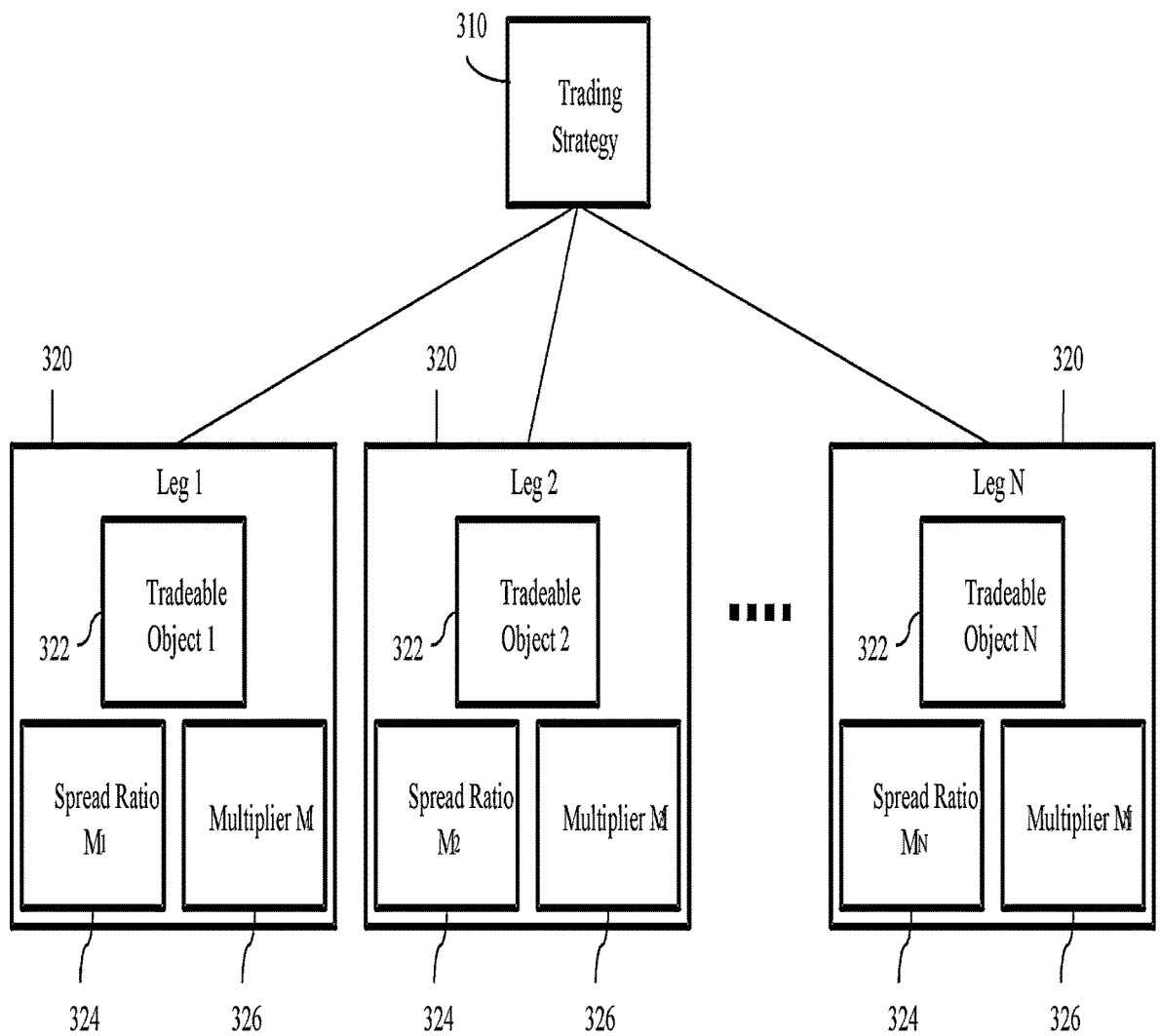
FIG. 3 illustrates a block diagram of a trading strategy which may be employed with certain embodiments of the present invention.

FIG. 3 illustrates a block diagram of a trading strategy 310 which may be employed by certain embodiments of the present invention. The trading strategy 310 includes "N" legs 320. The trading strategy 310 defines the relationship between the tradeable objects 322 for each of the legs 320 using the spread ratios 324 and multipliers 326 associated with each of the legs 320.

Once defined, the tradeable objects 322 in the trading strategy 310 may then be traded together according to the defined relationship. For example, assume that the trading strategy 310 is a spread with two legs 320. Leg 1 is for tradeable object A and Leg 2 is for tradeable object B. In addition, assume that the spread ratios 324 and multipliers 326 associated with Legs 1 and 2 are "1" and "−1," respectively. That is, the spread 310 is defined such that when the spread 310 is bought, 1 unit of tradeable object A is bought (positive spread ratio, same direction as the spread) and 1 unit of tradeable object B is sold (negative spread ratio, opposite direction of the spread). As mentioned above, typically in spread trading the opposite of the definition applies. That is, when the definition for the spread 310 is such that when the spread 310 is sold, 1 unit of tradeable object A is sold (positive spread ratio, same direction as the spread) and 1 unit of tradeable object B is bought (negative spread ratio, opposite direction of the spread).

The price for the trading strategy 310 is determined based on the definition. In particular, the price for the trading strategy 310 is typically the sum of price of the tradeable object 322 multiplied by the multiplier 326 for each of the legs 320 of the trading strategy 310. This is illustrated in Equation 1:

$$\text{StrategyPrice} = \sum_{i=1}^{N} \text{Mult}(i) \cdot \text{Price}(i) \qquad \text{Eq. 1}$$

Mult(i) is the multiplier associated with leg i and Price(i) is the price for the tradeable object for leg i. The price for a trading strategy may be affected by price tick rounding and/or pay-up ticks. However, both of these implementation details are beyond the scope of this discussion and are well-known in the art.

The discussion above applies whether the example spread is real or synthetic. Recall that, as discussed above, a real spread would be listed at an exchange, such as exchange 130 and/or 230, as tradeable product. In contrast, a synthetic spread would not be listed as a product at an exchange, but rather the various legs of the spread are traded at one or more exchanges. For the purposes of the following discussion, the trading strategy 310 is discussed as a synthetic trading strategy. However, similar techniques to those discussed below may also be applied when a real spread is being traded.

Continuing the example from above, if a trader believes that tradeable object A typically has a price 10 greater than tradeable object B, then the trader may want to buy the spread whenever the difference in price between tradeable objects A and B is less than 10 and sell the spread whenever the difference is greater than 10. As an example, assume that tradeable object A is at a price of 45 and tradeable object B is at a price of 40. The current spread price, using Equation 1, would then be (1)(45)+(−1)(40)=5, which is less than the typical spread of 10. Thus, the trader may buy 1 unit of the spread, which results in buying 1 unit of tradeable object A at a price of 45 and selling 1 unit of tradeable object B at 40. At some later time, the typical price difference may be restored and the price of tradeable object A is 42 and the price of tradeable object B is 32. At this point, the price of the spread is now 10. If the trader sells 1 unit of the spread to close out his position (that is, sells 1 unit of tradeable object A and buys 1 unit of tradeable object B), he has made a profit on the total transaction. In particular, while the trader bought tradeable object A at a price of 45 and sold at 42, losing 3, the trader sold tradeable object B at a price of 40 and bought at 32, for a profit of 8. Thus, the trader made 5 on the buying and selling of the spread.

The above example assumes that there is sufficient liquidity and stability that the tradeable objects can be bought and sold at the market price at approximately the desired times. This allows the trader to achieve the desired price for the spread 310. However, more generally, a trader determines a desired price at which to buy or sell a particular trading strategy. Then, an automated trading tool, for example, attempts to achieve that desired price by buying and selling the legs at appropriate prices. For example, when a trader enters an order to buy or sell the trading strategy 310 at a desired price, the automated trading tool may automatically place an order (also referred to as quoting an order) for one of the tradeable objects 322 of the trading strategy 310 to achieve the desired price for the trading strategy (also referred to as a desired strategy price, desired spread price, and/or a target price). The leg for which the order is placed is referred to as the quoting leg. The other leg is referred to as a lean leg and/or a hedge leg. The price that the quoting leg is quoted at may be based on the best price that an order could be filled at in the hedge leg. The best price is typically the best bid price when selling and the best ask price when buying. The best price in the hedge leg is also known as the leaned on price, lean price, or lean level. As the leaned on price changes, the price for the order in the quoting leg may also change in order to maintain the desired strategy price. It should be understood that the leaned on price could also be set to a price other than the inside market price. When the quoting leg is filled, the automated trading tool may then submit an order in the hedge leg to complete the strategy. This order may be referred to as an offsetting or hedging order and is typically quoted at the leaned on price. If the order at the leaned on price is not filled (or filled sufficiently to achieve the desired strategy price), then the trader is said to be "legged up" because the trader has not achieved the desired strategy relationship according to the trading strategy definition.

Also, depending on the trading strategy, the price of a quoted leg may be based on less than all of the other legs, for example. As another example, the order parameters of an order in a quoted leg may lean on other types of market conditions in the other legs such as the last traded price (LTP), the last traded quantity (LTQ), a theoretical value, multiple quantities such as quantities closer to the inside market, or some other reference point.

In addition to having a single quoting leg, as discussed above, a trading strategy may be quoted in multiple (or even all) legs. In such situations, each quoted leg still leans on the other legs. When one of the quoted legs is filled, the orders in the other quoted legs are typically cancelled and then appropriate hedge orders are placed based on the leaned on prices that the filled leg was based on.

A trading strategy with more than two legs is known as a multi-legged strategy or a multi-legged spread. In a multi-legged strategy, multiple sets of hedge prices can be chosen from to maintain the defined relationship of the trading strategy for a particular quoted leg.

III. Spread Order Modifiers

Certain embodiments of the present invention provide order modifiers in relation to a trading strategy, such as a spread, having a desired spread price and a desired order quantity. While the discussion below focuses on applying one or more modifiers to a spread trading strategy, it is understood that the disclosed principles could be applied to different types of trading strategies as well.

According to an example embodiment, the order modifiers include a quantity modifier and a price modifier that are applied to a desired order quantity and a desired price defined for a spread. The quantity and price modifiers may take many different formats, and could include a percentage value, a fraction, and/or a constant value that are used to modify the desired order quantity and the desired spread price, respectively. The quantity and price modifiers could also be determined using preset formulas. According to an example embodiment, the quantity modifier divides the desired order quantity for the spread to determine a plurality of desired order quantities (referred to hereinafter as "disclosed quantities"), such that only a portion of the desired spread order quantity is submitted, or disclosed, to the market at a time until the full desired spread order quantity is executed. Then, the price modifier determines a price level for each disclosed quantity of the spread order, such that each disclosed quantity for the spread order may be submitted at a different price level. It should be understood that two or more disclosed spread quantities could be submitted at the same price level, while each of the remaining disclosed spread quantities executed for the spread could be submitted at different price levels.

According to an example embodiment, a two-leg spread may be quoting a single leg. In such an embodiment, when a first disclosed spread is determined, i.e., a first disclosed quantity and a first disclosed spread price are determined for the first disclosed spread, the first leg of the spread may be quoted based on the first disclosed spread quantity and the first disclosed price and further based on market conditions in the other leg of the spread. In such an embodiment, a second disclosed spread may be submitted upon detecting a predetermined trigger. According to an example embodiment, the predetermined trigger may be detected upon receiving a fill of a hedge order that is submitted when the quoted leg is filled, or in other words, when the first disclosed spread is fully executed. Alternatively, the predetermined trigger could be detected prior to submitting the hedge or before detecting a fill of the submitted hedge order. Different embodiments are possible as well for detecting the trigger.

According to another example embodiment, two legs of a two-leg spread may be quoted at the same time. In such an embodiment, when a first disclosed spread is determined, the first leg and the second leg of the spread may be quoted based on the disclosed spread quantity and price, and further based on a spread definition. For example, when the first leg is filled, a hedge order may be submitted to hedge the fill of the quoted leg. When the hedge order is sent, the second disclosed spread may be submitted, and the second leg order of the spread may be re-priced based on the second disclosed spread price. Additionally, the quantity of the second leg order may be changed based on the second disclosed quantity. According to one example embodiment, when the hedge order is filled, a new order may be submitted for the first leg of the spread based on the second disclosed spread.

The process of submitting subsequent disclosed spread may be repeated until a full desired spread quantity is submitted, or until a predefined condition is detected. The predefined condition may be time-based, such as a specific time that triggers termination of the spread strategy, or a market related event, such as detecting a predetermined condition based on market data or other data, such as news data. For example, a trader may wish to cancel all trading strategies right before a certain number, such as the unemployment number, is released. It should be understood that different embodiments are possible as well. While the example embodiment describes re-pricing the existing quoted leg order upon sending the hedge order, it should be understood that the quoted leg order could also be re-priced prior to submitting the hedge order, or after the hedge order is filled.

A. Example System Configurations

Figure 4:
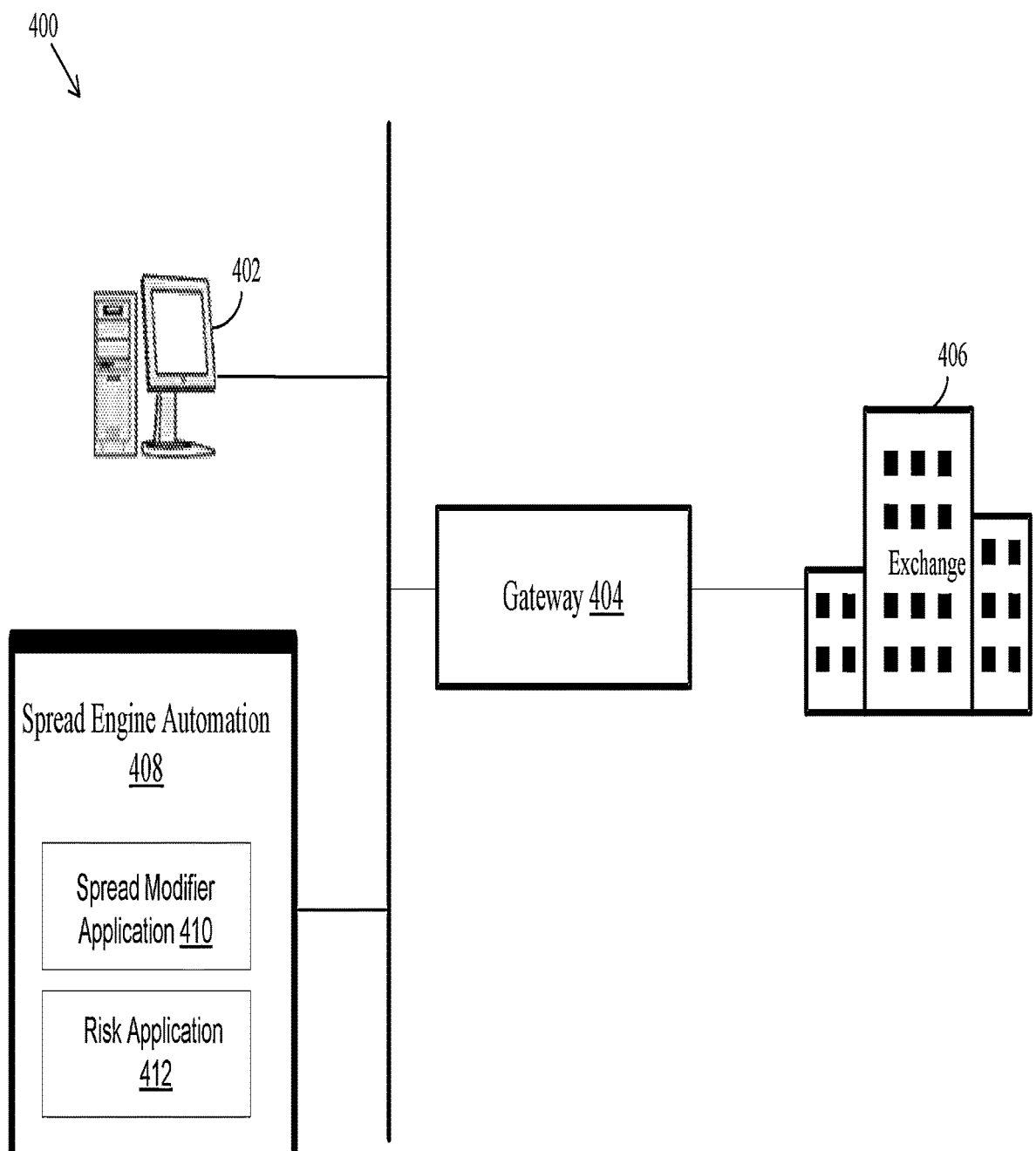
FIG. 4 illustrates an example electronic trading system in which certain embodiments of the present invention may be employed.

FIG. 4 illustrates an example electronic trading system 400 in which certain embodiments described herein may be employed. The system 400 includes a client device 402, a gateway 404, an exchange 406, and a spread engine automation component 408 that includes a spread modifier application 410 and a risk application 412. According to this example, the client device 402 is in communication with the gateway 404. The gateway 404 is in communication with the exchange 406.

In the illustrated example, the spread engine automation component 408 may be an automated spread trading application such as the one described in the U.S. Pat. No. 7,243,083, the contents of which are fully incorporated herein by reference. According to an example embodiment, spread orders placed via the client device 402 are processed using spread modifiers by the spread modifier application 410 and are risk checked by the risk application 412 according to the techniques described herein.

In an example embodiment, the spread engine automation component 408 may be located at the client device 402. Alternatively, the spread engine automation component 408 could be located at a server. Further, according to yet another example embodiment, some components of the spread engine automation 408 may be distributed between the client device 402 and a server that is in communication with the gateway 404 and the client device 402, such that the client 402 could perform spread modification, while the server could perform a risk check, for example. In yet another embodiment, the client 402 and the server may also be configured to share responsibility to perform a risk check or to apply spread modifiers to spread orders. Different embodiments are possible as well, such as allocating certain or all functions of spread modifier application 410 and the risk application 412 to the gateway 404.

According to an example embodiment, the client device 402 may include a user interface that enables a user to define spread modifiers, such as a quantity modifier and a spread price modifier. For example, when defining spread parameters, a spread configuration window may include a field that allows a user to define a spread price offset, such as a value of "0," "1," or "−1," for example. Additionally, as explained above, the quantity modifier may be defined as a single disclosed quantity value, that is a fraction of the desired spread quantity. Alternatively, a user could enter formulas that could be used to calculate a disclosed spread price and a disclosed quantity for each reload spread order. The spread modifiers specified by the user may then be used by the spread modifier application 410 to modify the spread parameters, as will be discussed in greater detail below.

Additionally, the spread modifier application 410 could be configured to provide different modified spread types that are preconfigured with certain modifier values. In such an embodiment, a user could select a specific modified spread type to trade, and the spread modifier application 410 may retrieve the settings associated with the selected spread type and apply the settings to determine a disclosed spread quantity and a disclosed price for each reload order of the modified spread.

The risk application 412 may perform risk management to determine if a trading strategy is approved based on the preset risk parameters. The risk application 412 may notify the client device 402 and the spread engine automation 408 whether a certain trading strategy can be used.

B. Example Implementation

According to an example embodiment, a quantity modifier may be defined as a single numerical value that is lower than a desired spread order quantity. In such an embodiment, a portion of the desired spread order quantity is disclosed to the market at a time, as a disclosed spread order, and a new disclosed spread order is submitted when the first disclosed spread quantity is executed. According to an example embodiment, the disclosed spread order is submitted a number of times until the desired spread quantity is executed or until the spread is canceled. For example, if a desired spread quantity is "5," the quantity modifier may be set to "1" to define a disclosed order quantity for each of five disclosed spread orders. The disclosed spread orders may be consecutively submitted to the market until the desired spread quantity is filled.

According to an example embodiment, when the first disclosed quantity corresponding to the first disclosed spread order is executed, a second disclosed spread order is submitted. The second disclosed spread order has a new disclosed spread quantity. According to the example embodiment provided above, with the quantity modifier set to "1," the second disclosed quantity, as well as the third, fourth, and fifth disclosed quantities, may be set to "1." However, it should be understood that the second disclosed order quantity, as well as the consecutive disclosed quantities, could be different than the first disclosed order quantity, thus, resulting in a different number of disclosed spread orders (different than "5" orders in the example above) being executed in the market until the desired spread order quantity is executed.

Additionally, as the quantity modifier is applied to determine a new disclosed quantity for each disclosed spread order, the price modifier may be applied to a desired spread price to determine a disclosed spread price for each disclosed spread order. According to an example embodiment, the price modifier may be defined as an offset that is applied to the desired spread price. However, it should be understood that the price modifier may be defined as a percentage that is applied to the desired spread price to determine a modified desired spread price for each consecutive disclosed spread order. Different embodiments are possible as well and may produce similar results.

In the embodiment where the price modifier is defined as a single offset, the offset value could be applied to the desired spread price of the last disclosed spread order. According to one example embodiment, the first disclosed spread order may be submitted at the desired spread price, and the offset may be applied to each subsequent disclosed spread order. Alternatively, the defined offset may be applied to the desired spread price to determine a disclosed spread price for the first disclosed spread order. The offset value could be positive or negative. When the offset value is positive, the next disclosed spread order may be placed "x" number of ticks away from the last disclosed spread price in the direction away from the market. When the offset value is negative, the next disclosed spread order may be placed "x" number of ticks away from the last disclosed spread price in the direction toward the market. If the offset value is "0," the next disclosed spread order may be placed at the same disclosed desired spread price as the previously disclosed spread order.

Table 1 illustrates an example set of price levels using the price offsets of "−1," "0," and "+1" for a buy spread order having a desired spread quantity of "5," a desired spread price of "1," and a quantity modifier of "1." According to the example illustrated in Table 1, the first disclosed spread order has a disclosed spread price of "1" that is equal to the desired spread price.

TABLE 1

|         | −1 Offset | 0 Offset | 1 Offset |
|---------|-----------|----------|----------|
| Order 1 | 1.0       | 1.0      | 1.0      |
| Order 2 | 2.0       | 1.0      | 0.0      |
| Order 3 | 3.0       | 1.0      | −1.0     |
| Order 4 | 4.0       | 1.0      | −2.0     |
| Order 5 | 5.0       | 1.0      | −3.0     |

According to the example provided in relation to Table 1, with the offset set to "1," the first disclosed buy spread order ("Order 1") has a first disclosed spread price of "1" that is equal to the desired spread price. In other words, according to the example embodiment in Table 1, the offset is not applied to the first disclosed spread order. However, in another embodiment, the offset could be applied to the first disclosed spread order as well. Once the first disclosed buy spread order is executed, a second disclosed buy spread order ("Order 2") having a disclosed quantity of "1" is submitted at a second disclosed spread price of "0.0." The price of the second disclosed buy spread order is determined by applying the offset of "1" to the first disclosed spread price of "1.0". As explained earlier, when the offset value is positive, the next disclosed spread order is placed "x" number of ticks away from the last disclosed spread price in the direction away from the market, where "x" is the offset value. Thus, applying the offset of "1" to the last disclosed spread price of "1.0," the second disclosed spread price is set to "0.0." When the second disclosed buy spread order is executed, a third disclosed buy spread order having a disclosed quantity of "1" is submitted at a third disclosed spread price of "−1.0." The third disclosed spread price is determined by applying the offset of "1" to the second disclosed spread price of "0.0." The fourth and fifth disclosed buy spread orders are subsequently submitted at the disclosed spread prices of "−2.0" and "−3.0," respectively.

Table 2 illustrates an example set of price levels using the price offsets of "−1," "0," and "+1" in relation to a sell spread order having a desired spread quantity of "5," a desired spread price of "1," and a quantity modifier of "1." According to the example provided in relation to Table 2, a disclosed quantity of each of the five disclosed sell spread orders is "1." Additionally, similarly to the example provided in Table 1, the offset is not applied to the price of the first disclosed sell spread order, and the price is set to the desired spread price of "1."

TABLE 2

|         | −1 Offset | 0 Offset | 1 Offset |
|---------|-----------|----------|----------|
| Order 1 | 1.0       | 1.0      | 1.0      |
| Order 2 | 0.0       | 1.0      | 2.0      |
| Order 3 | −1.0      | 1.0      | 3.0      |
| Order 4 | −2.0      | 1.0      | 4.0      |
| Order 5 | −3.0      | 1.0      | 5.0      |

According to the example provided in relation to Table 2 with the offset set to "1," the first disclosed spread sell order having a disclosed quantity of "1" is submitted at a first disclosed spread price of "1" that is equal to the desired spread price. Alternatively, as explained earlier, the first disclosed spread price could be determined by applying the offset to the desired spread price. Once the first disclosed sell spread order is executed, a second disclosed sell spread order having a disclosed quantity of "1" is submitted at a second disclosed spread price of "2.0." Similarly to the embodiment illustrated in relation to Table 1, the second disclosed spread price of "2.0" is determined by applying the offset of "1" to the disclosed spread price of the preceding order. As explained earlier, when the offset value is positive, the next disclosed spread order is placed "x" number of ticks away from the last disclosed spread price in the direction away from the market, where "x" is the offset value. When the second disclosed sell spread order is executed, a third disclosed sell spread order having a disclosed spread quantity of "1" is submitted at a third disclosed spread price of "3.0." The third disclosed spread price of "3.0" is determined by applying the offset of "1.0" to the second disclosed spread price of "2.0." The disclosed order quantities and the disclosed spread prices for the fourth and fifth orders may be determined in the similar manner and are shown in Table 2.

While the examples provided in relation to Tables 1 and 2 illustrate a single offset that is applied to a disclosed desired spread price of a previously disclosed order, it should be understood that different embodiments are possible as well. For example, multiple offsets could be defined and applied to a desired spread price, such as the first offset is "1," the second offset is "2," etc. Also, the offsets could be defined such that a difference between two consecutive disclosed spread prices is more than one tick. Different embodiments are possible as well.

According to the example embodiments, once the disclosed spread quantity and the disclosed spread price are determined, one or more legs of the spread may be quoted based on the modified spread parameters and the spread settings. As explained in the preceding sections, the prices and quantities of the quoted orders are determined using the disclosed spread quantity, the disclosed spread price, as well as other spread parameters, such as a spread ratio and a multiplier, for example.

FIGS. 5-11 illustrate a set of trading interfaces that may be used to enter modified spread orders and monitor the processing of the order according to one example embodiment. More information related to the illustrated trading interfaces can be found in the U.S. Pat. No. 6,772,132, the contents of which are fully incorporated herein by reference.

Figure 5:
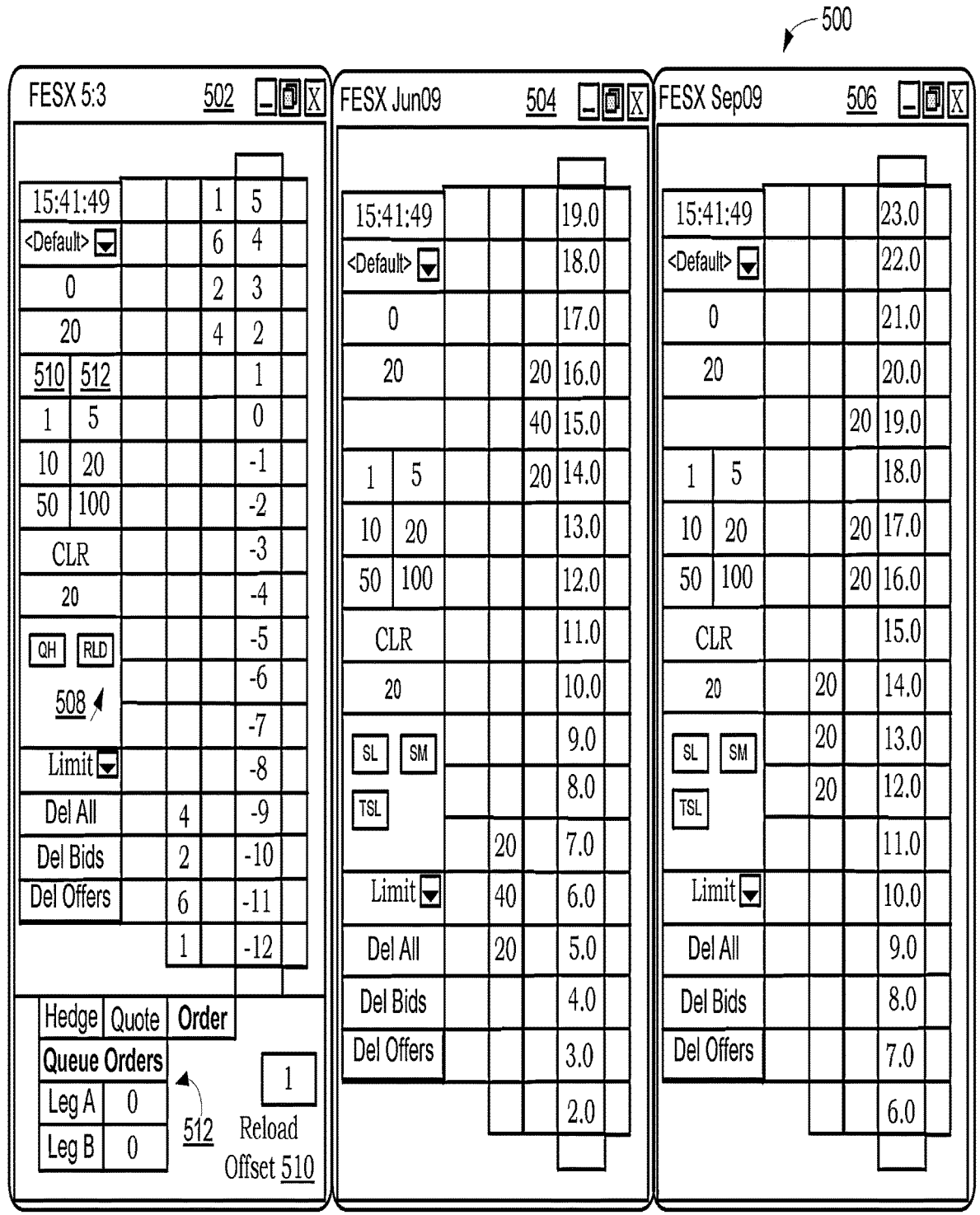
FIG. 5 illustrates a set of trading screens that are used to illustrate an example process of entering a modified spread order.

FIG. 5 illustrates a set of trading interfaces that can be used to enter a modified spread order according to an example embodiment. More specifically, a trading screen 502 illustrates current market conditions (prices and quantities) for a spread comprising two legs: FESX Jun 09 and FESX Sep 09, the market conditions of which are illustrated via trading screens 504 and 506. According to an example embodiment, the trading screen 502 may be used to configure a modified spread order. More specifically, the trading screen includes a reload ("RLD") button 508 that can be selected to configure a modified spread order. Once the RLD button 508 is selected, the button may be highlighted and quantity fields 510 and 512 may be displayed so that a trader can enter a total spread quantity and a disclosed quantity. An offset field 510 is also provided to enter an offset value that can be used in relation to modified spread orders. The trading screen 500 also enables a trader to define queue holder orders to be used in relation to each leg of the spread, as shown at 512. It should be understood that a separate interface could also be activated to allow a trader to define spread modifiers and/or queue holder orders. The use of queue holders will be described in greater detail below, and the example embodiments provided in relation to FIGS. 5-11 will assume that queue holders are not used.

Figure 6:
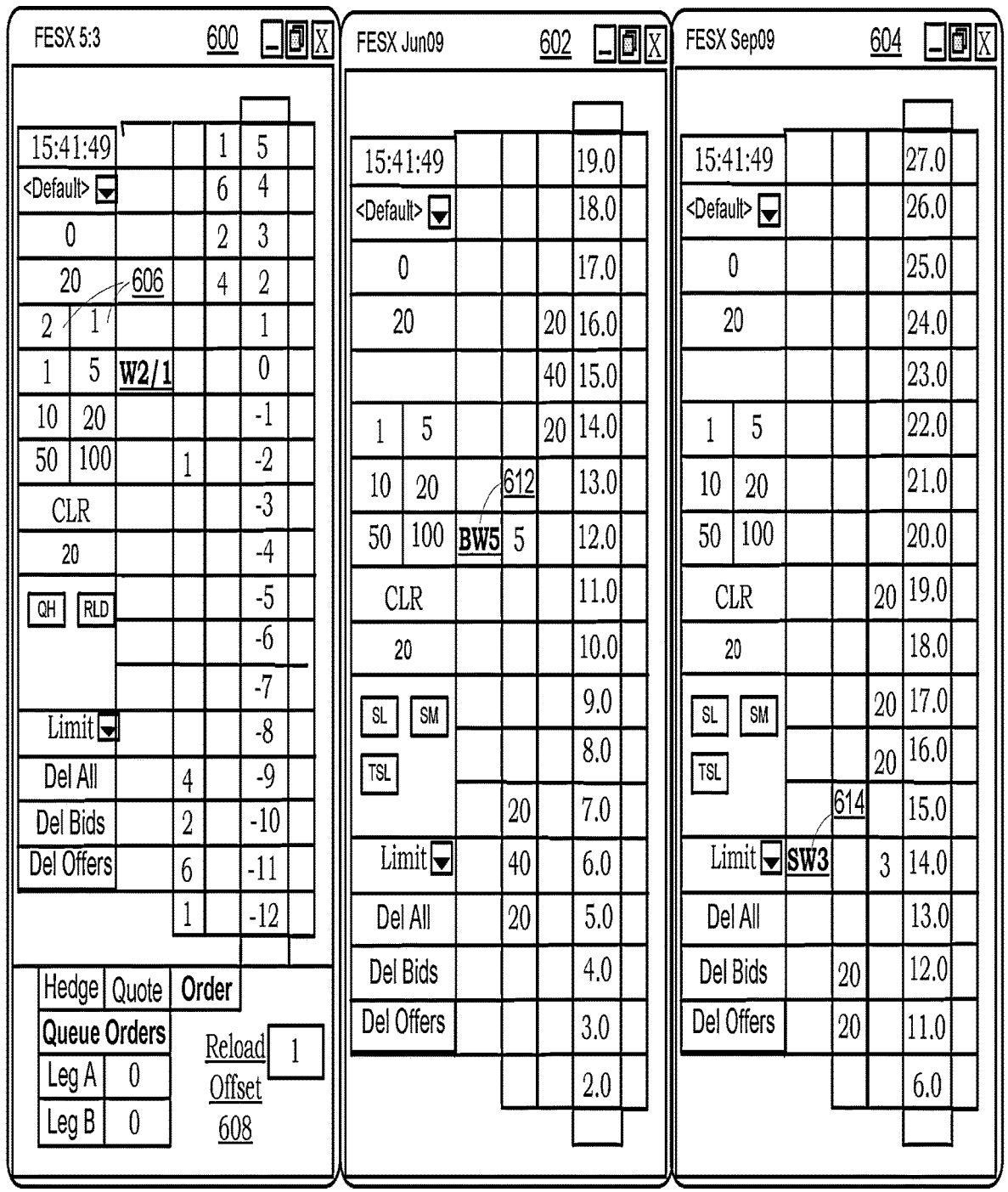
FIG. 6 illustrates a set of trading screens that are used to illustrate first disclosed quantities working in the market of each leg of a spread using spread modifiers.

FIG. 6 illustrates a set of trading screens 600-606 that show first disclosed quantities working in the legs of the spread. According to the example illustrated in relation to the trading screen 600, a buy 5:3 spread order having a desired spread quantity of "2" and a disclosed spread quantity of "1," as shown at 606, and an offset of "1," as shown at 608, is entered at a desired spread price of "0," as shown at 610.

According to an example embodiment, the first disclosed spread having a disclosed quantity of "1" is entered at the price of "0." As shown at 602 and 604 both legs of the spread are quoted, with the first leg order having a quantity of "5," as shown at 610, and the second leg having a quantity of "3," as shown at 614. The quantities for the leg orders are determined based on the disclosed spread quantity of "1" and the spread ratio of "5:3." The leg orders 612 and 614 are quoted at prices of "12.0" and "14.0," and the prices are determined based on the desired spread price of "0" and the lean prices of each market.

FIG. 7 illustrates an example order book interface 700 reflecting the currently pending leg orders for the spread. As shown in the order book interface 700, a 5-lot quoting order and a 10-lot position reserve order are added for FESX Jun09. The 10-lot position reserve order, as will be explained in greater detail below, covers the risk for a possible hedge order and a remaining undisclosed quantity. Thus, the 10-lot position reserve order, in this example, includes a 5-lot hedge order and a 5-lot remaining undisclosed quantity for FESX Jun09. Then, for FESX Sep09, a 3-lot quoting order and a 6-lot position reserve order are shown in the order book 700. The 6-lot position reserve for FESX Sep09 includes a 3-lot hedge order and a 3-lot remaining undisclosed quantity.

Figure 8:
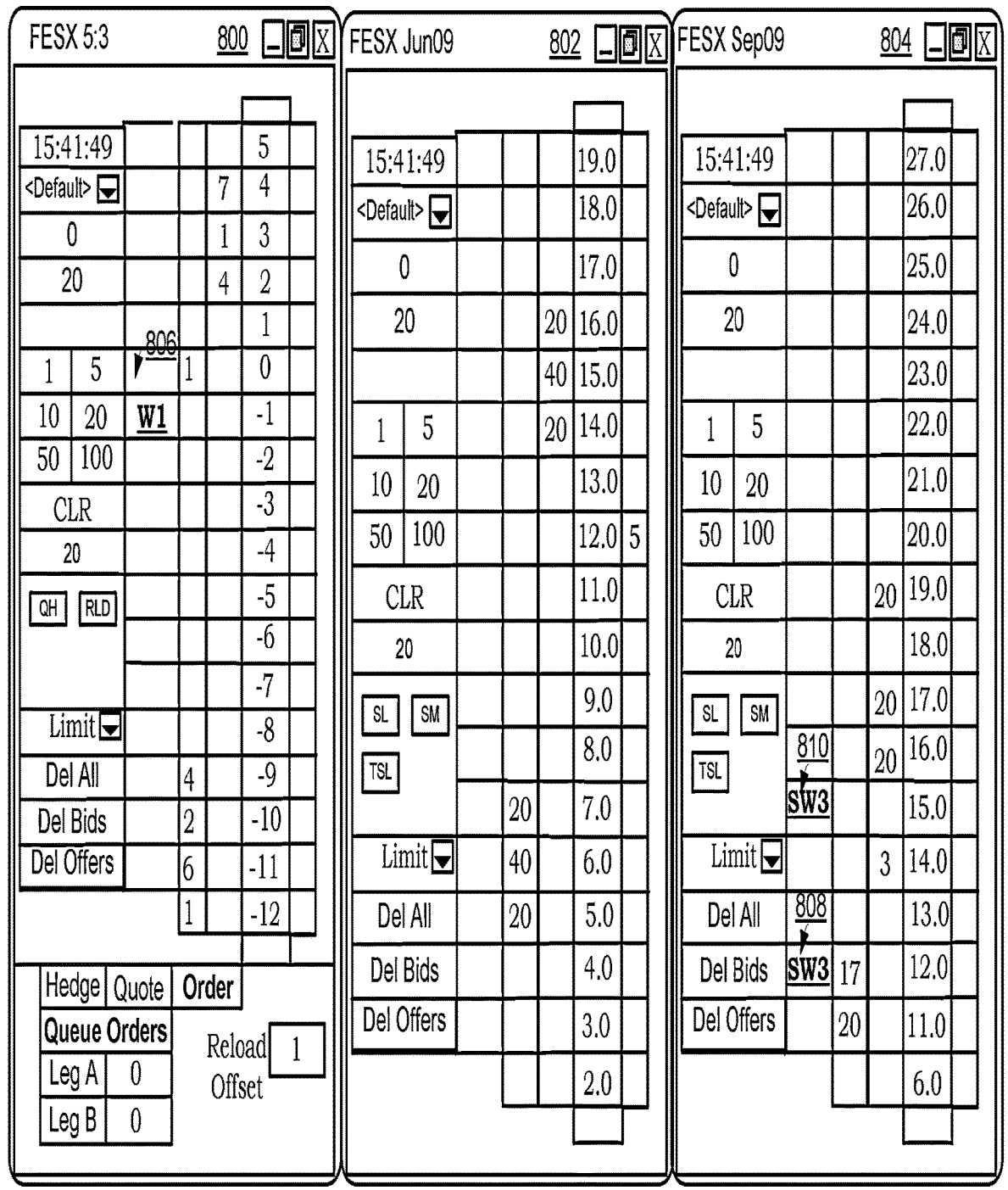
FIG. 8 illustrates a set of trading screens that are used to illustrate second disclosed quantities working in the market of each leg of the spread upon placing a new disclosed spread order.

FIG. 8 illustrates a set of trading screens 800-804 upon placing a second disclosed spread order having a disclosed spread quantity of "1" and a disclosed spread price of "−1." The new disclosed spread quantity is determined based on the disclosed quantity of "1," and the disclosed spread price is determined by applying the preset offset of "1" to the previously disclosed spread price of "0." More specifically, it is assumed that the 5-lot order for FESX Jun09 was filled and that a 3-lot hedge order was sent at the price of "12" for FESX Sep09, as shown at 808, prior to submitting the new disclosed spread order. As shown in the trading screen 800, a graphical indicator 806 illustrates a new disclosed spread order ("W1") at the new disclosed spread price of "−1."

As mentioned earlier, according to an example embodiment, when more than one leg is quoted for a spread, and one of the quoting legs is filled, a hedge order is sent, and the unfilled quoting orders may be re-priced based on the new disclosed spread price. Then, a new quoting order for the filled leg may be submitted when the corresponding hedge order is filled. Thus, when the new disclosed spread is submitted, the 3-lot quoting order for FESX Sep09 is re-priced to "15.0," as shown at 810, based on the new disclosed spread price of "−1" and the leaned on price of "14.0" corresponding to the best ask of FESX Jun09. As explained above, rather than re-pricing the quoted order upon placing the hedge order, the quoted order could be re-priced prior to submitting the hedge order or after the hedge order is filled.

Figure 9:
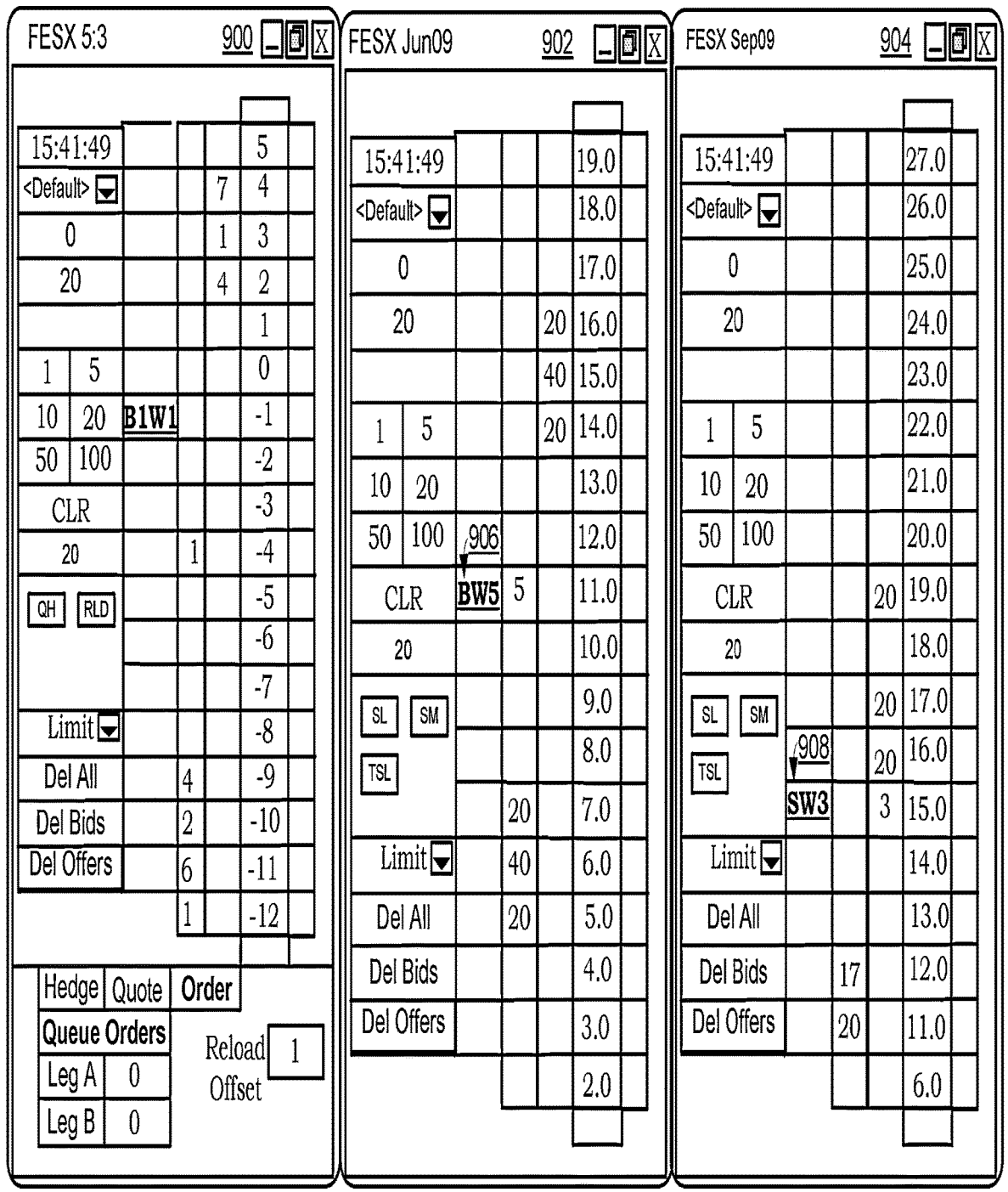
FIG. 9 illustrates a set of trading screens that are used to illustrate pending orders upon receiving a fill of a hedge order in one leg of the spread.

FIG. 9 illustrates a set of trading screens 900-904 upon receiving a fill of the hedge order in FESX Sep09. More specifically, as shown in the screen 902, a new quoting order 906 is sent in FESX Jun09 at the price of "11.0" leaning on "12.0" of FESX Sep09. As mentioned in relation to FIG. 8, the other leg is also quoted, as shown at 908.

FIG. 10 illustrates an updated order book 1000. More specifically, upon submitting a new quoting order for FESX Jun09, the position reserve of FESX Jun09 is reduced to "5." The order book 1000 also shows an updated position reserve of "3" for FESX Sep09. According to one example embodiment, the position reserve for FESX Sep 09 may be updated once the hedge order for FESX Sep09 is sent.

Figure 11:
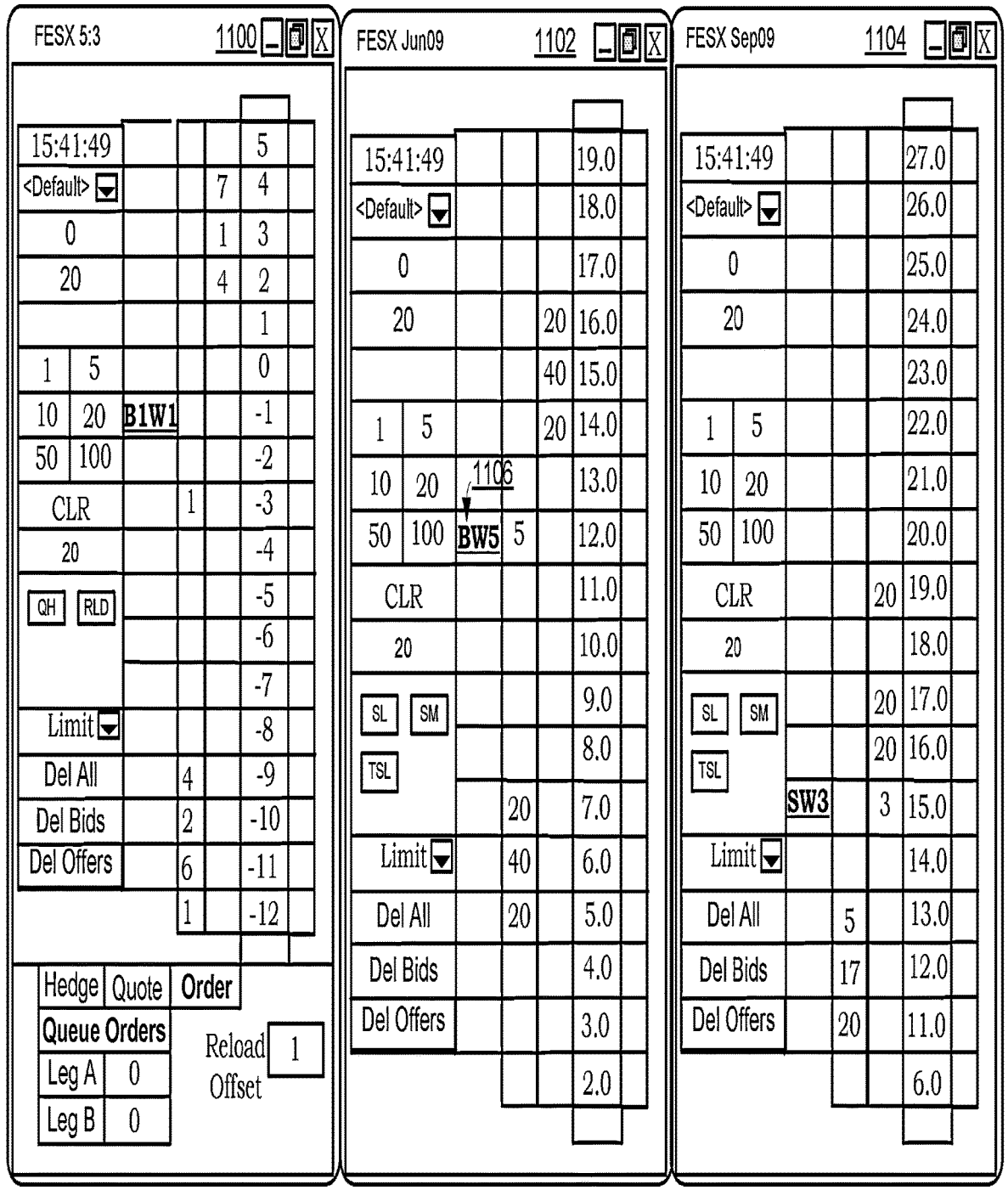
FIG. 11 illustrates a set of trading screens that are used to illustrate pending orders upon detecting a change in market conditions in one leg of the spread.

FIG. 11 illustrates a set of trading screens 1100-1104 upon detecting a change in the market conditions in one leg of the spread. More specifically, as shown in the trading screen 1104, the best bid price changed to "13.0" in the market of FESX Sep09. Thus, upon detecting the change, the buy order of FESX Jun09 is re-quoted to "12.0," as shown at 1106, to reflect the change in the lean price. When one of the remaining quoting orders is filled, a new hedge order will be sent, and the other quoted order may be pulled from the market, as this is the last disclosed spread quantity.

C. Pre-Trade Risk Management

As mentioned earlier, the existing pre-trade risk management systems that are used in relation to spread trading strategies allocate enough risk balance to cover all possible hedges. For example, in relation to a 10-lot 5:3 spread trading strategy, with both legs being quoted, the pre-trade risk management system would allocate the position of "50" for the quoting order of leg A, and "50" for a position reserve order of leg A (a possible hedge order), thus allocating the risk position of "100" for leg A alone. Similarly, the pre-trade risk management system would allocate the position of "30" for the quoting order of leg B, and "30" for a position reserve order of leg B, thus allocating the risk position of "60" for leg B.

In the example embodiments that disclose a partial spread quantity until a desired spread quantity is filled, the pre-trade risk management is modified such that the risk management system only allocates enough risk to cover the orders that are in the market. For example, in relation to the above 10-lot, 5:3 spread example, with the disclosed quantity set to "1," and both legs being quoted, the quantity of "5" would be quoted for leg A and the quantity of "3" would be quoted for leg B. In this example, the risk management system would allocate a risk position of "5" for the order quantity being currently quoted in the market for leg A. Additionally, a position reserve, also referred to as "a position reserve quantity," would be reserved for leg A. According to an example embodiment, a position reserve for a leg includes a hedge quantity that is required to hedge an order quantity being quoted in another leg, and a remaining order quantity to be quantity in the leg. Thus, the position reserve for leg A is set to "50," with "5" of "50" being reserved to hedge the order quantity of "3" that is currently quoted in leg B, and "45" of "50" being reserved for execution of the remaining quantity in leg A of the spread. Thus, according to the modified pre-trade risk management, the pre-trade risk system would allocate a total risk position of "55" for leg A, as compared to "100" if the full quantity of "50" was quoted for leg A and if the full quantity of "30" was quoted for leg B.

Similarly, a risk position allocated to leg B is also lower, as the risk position allocated to leg B is "33." The risk position of "33" includes a risk position of "3" allocated to an order being quoted in leg B, and a position reserve of "30." The position reserve of "30" includes a position of "3" being held to hedge the order of "5" that is quoted in leg A, and "27" being reserved for execution of the remaining quantity in leg B. Thus, the total risk position of "33" is allocated for leg B. Once again, the allocated risk position in the modified risk management system is lower than "60" that would have been allocated for leg B in the above example that involved quoting the quantity of "30" in leg B.

According to an example embodiment, the modified risk management system may update the risk position being reserved for a leg of a spread when a disclosed spread quantity is executed and a new disclosed quantity spread order is placed, rather than when a quoting order is filled. Because a new disclosed quantity for the spread is not submitted to the market until the currently pending disclosed spread quantity is filled, the trader's risk will be covered with a minimal risk position taken to cover the exposure in the market. In such an embodiment, when the final disclosed spread quantity is working in the market, the risk position reserved for a leg order is equal to a quantity that will be sent to hedge the order being quoted in the other leg of the spread.

The risk position being held for a leg of a spread may be determined using a definition, such as illustrated in Equation 2:

$$Leg_xPosResQ=Leg_xRatio\times(SpreadQty-SpreaddDisclosedQty)+ForEachOtherQuotingLeg((Leg_xRatio\times SpreadDisclosedQty)\times(1+OtherLegQHQty)) \quad \text{Eq. 2}$$

"$Leg_xRatio$" is the leg ratio, or a number of orders that will be placed on that leg for one spread unit, "SpreadQty" is a desired spread quantity, "Spread DisclosedQty" is a disclosed spread quantity, and "OtherLegQHQty" is a quantity pending for each queue holder order (the use of queue holder orders will be described in later sections). Then, the second part of the equation (2) starting with, "ForEachOtherQuotingLeg," determines the total hedge order quantity that may be needed for the spread order. More specifically, "ForEachOtherQuotingLeg" refers to other legs of the spread that are quoting and which would possibly cause a hedge order to be sent in $Leg_x$. For example, if three legs are being quoted, and the current leg ($Leg_x$) is not being quoted, if all three quoted legs are filled, 3 hedges would be sent on the current leg ($Leg_x$).

According to the spread example described above, with the 10-lot, 5:3 spread having a disclosed quantity of "1," and no queue holder orders, the position reserve quantity for Leg A may be calculated as shown in Equation 3:

$$Leg_APosRes=5\times(10-1)+(5\times1)\times1=45+5=50 \quad \text{Eq. 3}$$

Similarly, the position reserve quantity for Leg B may be calculated as shown in Equation 4:

$$Leg_BPosRes=3\times(10-1)+(3\times1)\times1=27+3=30 \quad \text{Eq. 4}$$

Now, assuming that both orders have two queue holder orders, the position reserve quantity for Leg A may be calculated as shown in Equation 5, and the position reserve quantity for Leg B may be calculated as shown in Equation 6:

$$Leg_APosRes=5\times(10-1)+(5\times1)\times(1+2)=45+15=60 \quad \text{Eq. 5}$$

$$Leg_BPosRes=3\times(10-1)+(3\times1)\times(1+2)=27+9=36 \quad \text{Eq. 6}$$

FIGS. 12 and 13 illustrate processing flows 1200 and 1300 for order placement and risk allocation for a modified spread and a standard spread, respectively. More specifically, FIG. 12 illustrates order placement and risk allocation for a 3-lot, 5:3 spread using spread modifiers, with a disclosed spread quantity of "1," and both legs being quoted. Then, FIG. 13 illustrates risk allocation for a standard 3-lot, 5:3 spread, with both legs being quoted to achieve the full 3-lot spread.

Referring to FIG. 12, as shown at 1202, a 5-lot quantity (5-lot Q) and a 3-lot quantity (3-lot Q) are quoted in Leg A and Leg B, respectively, with "5" being the risk associated with the quoted order of Leg A, and "3" being the risk associated with the quoted order of Leg B. The disclosed quantities of "5" and "3" for each leg are determined based on the spread ratio and a quantity modifier, i.e., the disclosed spread quantity of "1."

As shown at 1202, the position reserve ("PR") risk for Leg A is set to "15" (with "5" being the risk allocated to cover a hedge order for Leg B, and "10" being the risk allocated to cover the remaining quantity to be filled for Leg A). Similarly, as shown in relation to Leg B, the PR risk is set to 9 (with "3" being the risk allocated to cover a hedge order for Leg A, and "6" being the risk allocated to cover the remaining quantity to be filled for Leg B). While not specifically shown in FIG. 12, it should be understood that the prices at which both legs are quoted are determined based on a disclosed spread price of the first disclosed spread order, and the market conditions in each leg, as explained and shown above.

At 1204, it is assumed that the quoted order of Leg A is filled. When one of the quoted leg orders is filled, a hedge order in the other leg (here Leg B) is sent to the market. As shown at 1206 in FIG. 12, a 3-lot hedge order ("3-lot H") is sent for Leg B. According to one example embodiment, when a fill is detected in one of the legs of the spread, the quoting orders pending in the other legs of the spread are not deleted if there is a spread quantity remaining to be filled. Thus, the 3-lot quoting order (3-lot Q) for Leg B remains in the market and is re-priced based on the second disclosed spread price. According to an example embodiment, the quoting order for Leg B may be re-priced when the hedge order is sent. While the example does not illustrate partial fills, it should be understood that when a partial fill is detected in relation Leg A, the other quoting order of Leg B is not re-priced. Rather, the quantity of the other quoted order is reduced.

As shown at 1206, the PR risk for Leg B is updated to "6" when the 3-lot H is sent for Leg B. The updated amount reflects the quantity that was filled for the quoted order in Leg A. Also, as shown at 1206, the PR risk for Leg A remains the same, i.e., "15," as no additional disclosed quoting orders were placed in Leg A.

At 1208, the first disclosed spread quantity is detected ("Spread Fill 1") when the 3-lot H order for Leg B is filled. At 1210, a new order for Leg A is submitted ("5-lot Q"), and the PR risk for Leg A is updated to "10," with the quantity of "5" allocated for a possible hedge of Leg B and "5" allocated for the remaining quantity to be quoted in Leg A. The 3-lot order is already quoted for Leg B based on the new disclosed spread price, and the quoted Leg B order was re-priced after submitting the hedge order. It should be understood that the prices for the orders quoted for Legs A and B are determined based on a new disclosed spread price. As mentioned earlier, the new disclosed spread price could be the same or different than the previously disclosed spread price, depending on the spread price modifier(s) defined for the spread strategy.

When the quoting order of Leg A is filled, as shown at 1212, another hedge order is sent for Leg B, as shown at 1214. The position reserve for Leg B is also updated to "3." When the hedge order for Leg B is filled, as shown at 1216, thus, resulting in the full execution of the second disclosed spread order, a new quoting order having a quantity of "5" is placed for Leg A, and the position reserve of Leg A is updated to "5," as shown at 1218. Leg B is quoted as well, and the position reserve for Leg B remains at "3." It should be understood that the quoting orders on Leg A and Leg B are quoted at prices that are determined based on a disclosed spread price of the reload spread order, as well as the current market conditions in each of the legs of the spread. Additionally, it should be understood that each quoted order may be re-priced based on changing market conditions to achieve the disclosed spread price.

When the last quoting order of Leg A is filled, as shown at 1220, the quoting order and the position reserve for Leg B are deleted, and a hedge order for Leg B is sent to the market, as shown at 1222. The position reserve for Leg A remains at "5" to cover a potential hedge from the quoting order on Leg B. The 5-lot PR remains in the market until the delete of Leg B quoting order is confirmed. At 1224, the position reserve for Leg A is deleted, and at 1226, the hedge order of Leg B is filled, thus, completing the spread processing, according to one example embodiment.

For comparison, FIG. 13 illustrates risk allocation for the same 3-lot, 5:3 spread that does not use spread modifiers described above.

As shown at 1302, with both legs being quoted and having the quoted quantities of "15" and "9," respectively, the risk position allocated to each leg of the spread is "30" and "18," respectively. Referring back to FIG. 12, as shown at 1202, the risk allocated to each leg of the modified spread was "20" and "12" for Leg A and Leg B, respectively.

As shown at 1312 in FIG. 13, when a partial fill of "5" is detected for the spread, the risk allocated to Leg A is "20," and the risk allocated to Leg B is "12," as compared to "15" and "9" shown at 510 in FIG. 5. Steps 604-608 illustrate the intermediate steps of receiving the partial fill in Leg A, updating a quoted order for Leg B, sending a hedge order for Leg B, and receiving a fill in relation to the submitted hedge order.

At 1314, another partial fill of "5" in the quoted Leg A is detected. When the hedge order is filled in Leg B, the risk allocated to the spread is "10" for Leg A and "6" for Leg B, as shown at 1322. When the final partial fill is detected for Leg A, as shown at 1324, a 3-lot hedge order is submitted in Leg B. Once the hedge of Leg B is filled, the spread is executed, as shown at 1330.

Comparing FIGS. 12 and 13, it can be seen that using the partial disclosed spread embodiments, a trader's risk exposure is lower. More specifically, as shown in relation to FIG. 12, only partial quantities of "5" and "3" are in the market at any given time, as compared to the quantities of "15" and "9," as shown in FIG. 13. Additionally, the possible overfill amount is lower when using the partial disclosed spread quantities.

D. Queue Holder Orders

The modified spread order concepts described above could be used in combination with queue holder orders. As described in the preceding sections, when a disclosed spread order is executed, a new disclosed spread quantity is generated and a new order for a leg of the spread is submitted to the market. In such an embodiment, when a new order for a leg of the spread is submitted to the market, it is placed at the end of the order queue corresponding to a price at which the leg is quoted.

According to one example embodiment, one or more additional queue holder orders may be submitted in relation to each leg quoting order at prices either below or above the price calculated for each quoting leg. When a quoted leg order is to be re-priced, and there is a pending queue holder order at a new quoted price, the queue holder order may be used as the quoted leg order. Thus, one advantage of using queue holder orders is that a re-priced quoting order of the spread may have a better queue position if one of the existing queue holder orders is at the newly quoted price of the leg order. The prices of the queue holder orders at which the queue holder orders are quoted may change as the price of the quoting leg order changes, with some queue holders being deleted and one or more new queue holder orders being added to maintain a desired number of queue holders in the market for each leg of the spread. More information related to submitting and processing queue holder orders can be found in the U.S. patent application Ser. No. 11/241,168, entitled "System and Method for Order Placement in an Electronic Trading Environment," the contents of which are fully incorporated herein by reference.

Typically, when a quoting leg of the spread is filled, the corresponding queue holder orders are deleted. According to one example embodiment, when queue holder orders are used in relation to a modified spread strategy, rather than deleting the queue holder orders every time a disclosed spread quantity is executed, the queue holder orders are maintained in the market and remain attached to the modified spread strategy until the final disclosed quantity for the spread is executed.

According to one example embodiment, N orders may be submitted for each leg being quoted for a spread, with N−1 being the queue holder orders. If the quoted order is a buy order, N−1 queue holder orders may be submitted below the price of the quoted buy order. If the quoted order is a sell order, N−1 queue holder orders may be placed above the price of the quoted sell order. According to one example embodiment, the prices of N−1 queue holder orders placed above or below the price of the quoted order may be consecutive prices. Alternatively, the prices may not be consecutive, with some price gaps being used between two consecutive queue holder orders, or between the quoting leg order and the first queue holder order.

Table 3 illustrates one example embodiment of using queue holder orders in relation to one of the legs of a spread strategy using a spread quantity modifier, such as a disclosed spread quantity described above. Additionally, the queue holder example of Table 3 assumes that a price modifier is not used, or in other words, that no offset is being applied to the next disclosed price of the spread order.

TABLE 3

| Original Orders | Post "Quoting Order1" Fill | Post "Hedge Order" Fill | Submit a Disclosed Q Order |
|---|---|---|---|
| Quoted Ord 1 | Filled | | New Quoted Ord2 |
| QH1 | QH1 | QH1 | QH1 |
| QH2 | OH2 | QH2 | QH2 |
| QH3 | QH3 | QH3 | QH3 |
| QH4 | QH4 | OH4 | QH4 |

According to the example illustrated in Table 3, the first quoted order "Quoted Ord 1" may be a buy quoting order pending in one of the legs of the spread. When the first quoted order is submitted, four queue holder orders ("QH1-QH4") may be submitted at four consecutive prices below the quoted buy price. Then, the first quoted order is filled, as shown in the second column of Table 3, but the queue holder orders QH1-QH4 remain pending in the market, as there is a next disclosed spread quantity to be submitted. As explained above, when the quoting order is filled, a hedge order in one or more other legs of the spread is submitted. When the hedge order gets filled, once again, the queue holder orders QH1-QH4 remain pending in the market in the first leg of the spread. When a new disclosed quantity order is generated for the spread, a new quoted order ("New Quoted Ord2") is submitted in the leg. Assuming that the price modifier is set to "0," and there are no changes in the market of the second leg of the spread, the new disclosed spread order may be submitted at the same price level as the previously disclosed spread order quantity. Assuming that the New Quoted Ord2 is submitted at the same price level as the filled order, the queue holder orders would also remain pending at the same price levels, as shown in column 4 of Table 3.

As mentioned earlier, when a price level of a quoting leg order changes based on the changes in the leaned on price(s), the quoting leg order as well as the corresponding queue holder orders may be re-priced. For example, re-pricing of the queue holder orders may involve canceling one the pending queue holder orders, such as the highest priced queue holder order, and placing a new queue holder order at a price lower than the lowest price of the pending queue holder. The methods for re-pricing queue holder orders are described in the U.S. application Ser. No. 11/241,168 cited above and incorporated herein by reference. Additionally, while Table 3 illustrates using queue holder orders in relation to only one leg of the spread, it should be understood that queue holder orders could be used in relation to all or some of the legs of the spread using the modifiers described herein.

As mentioned earlier, when queue holder orders are used in relation to a leg of a spread, the queue holder orders are not cancelled until a final disclosed spread quantity is filled. Thus, a trader may take advantage of a more favorable queue position maintained by the queue holder orders when a new disclosed spread quantity is submitted for execution.

Table 4 illustrates one example embodiment for using queue holder orders in relation to a leg of a spread strategy that uses price modifiers and quantity modifiers described above. In other words, the example of Table 5 assumes that the spread strategy uses a disclosed quantity and a price offset to determine a price and a quantity of each disclosed spread order. Once again, the example illustrates the use of queue holder orders in relation to one of the legs of the spread. However, as explained above, queue holder orders could be used in relation to all legs being quoted for the spread strategy.

TABLE 4

| Original Orders | Post "Quoting Order1" Fill | Post "Hedge Order" Fill | Submit a Disclosed Q at Offset = 1 |
|---|---|---|---|
| Quoted Ord 1 | Filled | | |
| QH1 | QH1 | QH1 | Quoted Order = QH1 |
| QH2 | QH2 | QH2 | QH2 |
| QH3 | QH3 | QH3 | QH3 |
| QH4 | QH4 | QH4 | QH4 |
| | | | New QH5 |

Referring to the first column of Table 4, the first quoted order "Quoted Ord 1" may be a buy quoting order pending in a leg of a spread. When the first quoted buy order is submitted, four queue holder orders ("QH1-QH2") may be submitted at four consecutive prices below the quoted buy price. When the first quoted order is filled, as shown in the second column of Table 4, the queue holder orders remain pending in the market if there is a subsequent disclosed spread quantity to be submitted to the market. As explained above, when the quoting order is filled, a hedge order may be submitted in one or more legs of the spread. When the hedge orders are filled, the queue holder orders remain pending in the market. Subsequently, when a new disclosed spread quantity is determined for the spread, a new quoted order ("New Quoted Order") is generated for the leg of the spread based on the new disclosed spread price and market conditions of the leaned on legs. Assuming that a new quoted order is at the price of the first queue holder order ("QH1"), the queue holder order ("QH1") may be used for the newly quoted order, as shown in the fourth column of Table 4. Then, to maintain four queue holder orders in the market, a new queue holder order ("New QH5") is placed at a price level below the N-th queue holder order. In the example illustrated in Table 4, the new queue holder order is placed one tick below the fourth queue holder order ("QH4").

It should be understood that with a different offset being applied to the next disclosed spread quantity, the next leg order may be quoted at the price of the second queue holder order ("QH2"), for example. In such an embodiment, "QH1" would be re-priced below the price of the N-th queue holder (here "QH4"), and "QH2" could be used for the new quoted order. Additionally, a new queue holder order would be added to maintain four queue holder orders pending in the leg of the spread.

Table 5 illustrates one example embodiment for using queue holder orders in relation to one leg of a spread strategy that uses the price modifiers and the quantity modifiers embodiments described above. The example of Table 5 assumes that the spread strategy uses a disclosed quantity and a price offset of "2" to be applied to each disclosed spread quantity. Once again, the example illustrates using queue holder orders in relation to one leg of the spread. However, as explained above, queue holder orders could be used in relation to all legs being quoted for the spread strategy.

TABLE 5

| Original Orders | Fill | Apply Offset = 2 | First Hedge Filled | Apply Offset = 2 | Second Hedge Filled | | |
|---|---|---|---|---|---|---|---|
| Quoted Ord 1 | Filled | | | | | | |
| QH1 | QH1 | | | Filled | | | |
| QH2 | QH2 | QH2 | QH2 | QH2 | | | |
| QH3 | QH3 | QH3 | QH3 | QH3 | | | |
| QH4 | QH4 | QH4 | QH4 | QH4 | QH4 | QH4 | QH4 |
| | | QH5 R | QH5 | QH5 | QH5 | QH5 | QH5 |
| | | | | | QH6 | QH6 | QH6 |
| | | | | | QH7 | QH7 | QH7 |
| | | | | | | | QH8 |

In the example provided in relation to Table 5, it is assumed that the two leading orders are filled in the leg that is quoted, with the system being configured to process one order at a time. According to one example embodiment, when a fill message is received for the first quoted order ("Quoted Ord 1"), as shown in the second column of Table 5, a hedge order is sent. It should be understood that more than one hedge order could be sent for a spread trading strategy that includes more than two tradeable objects. Since the offset is set to "2," the system attempts to re-quote "QH1" to be price below the N-th queue holder order (here "QH4"). However, as mentioned above, the quoted order and the first queue holder order were filled. Thus, when the system attempts to re-quote the first queue holder order "QH1," the re-quote of the order is rejected, as shown in the third column of Table 5 at "QH5 R."

When the system receives a fill message for the first queue holder order "QH1," the system may send a second hedge order for "QH1." When the first hedge is filled, as shown at the fourth column of Table 5, the system adds a new queue holder order "QH5." According to the example illustrated in Table 5, it is assumed that based on the new disclosed spread price that was determined with the offset of "2," the pending orders "QH2" and "QH3" are re-quoted below the current "N-th" price of the N-th queue holder order. As shown in the sixth column of Table 5, "QH2" and "QH3" are re-quoted, such that "QH4"-"QH7" are quoted in the leg of the spread. When the second hedge order is filled, as shown in the sixth column, a new order is placed "QH8," as shown in the eighth column of Table 5.

E. Example Quoting Fill and Hedge Fill Processing

As mentioned earlier, when a quoting order fill is received, one or more hedge orders may be sent. According to one example embodiment, the system may process quoting orders and hedge orders differently. Thus, processing of the quoting orders and hedge orders will be illustrated in two different flow diagrams.

Figure 14:
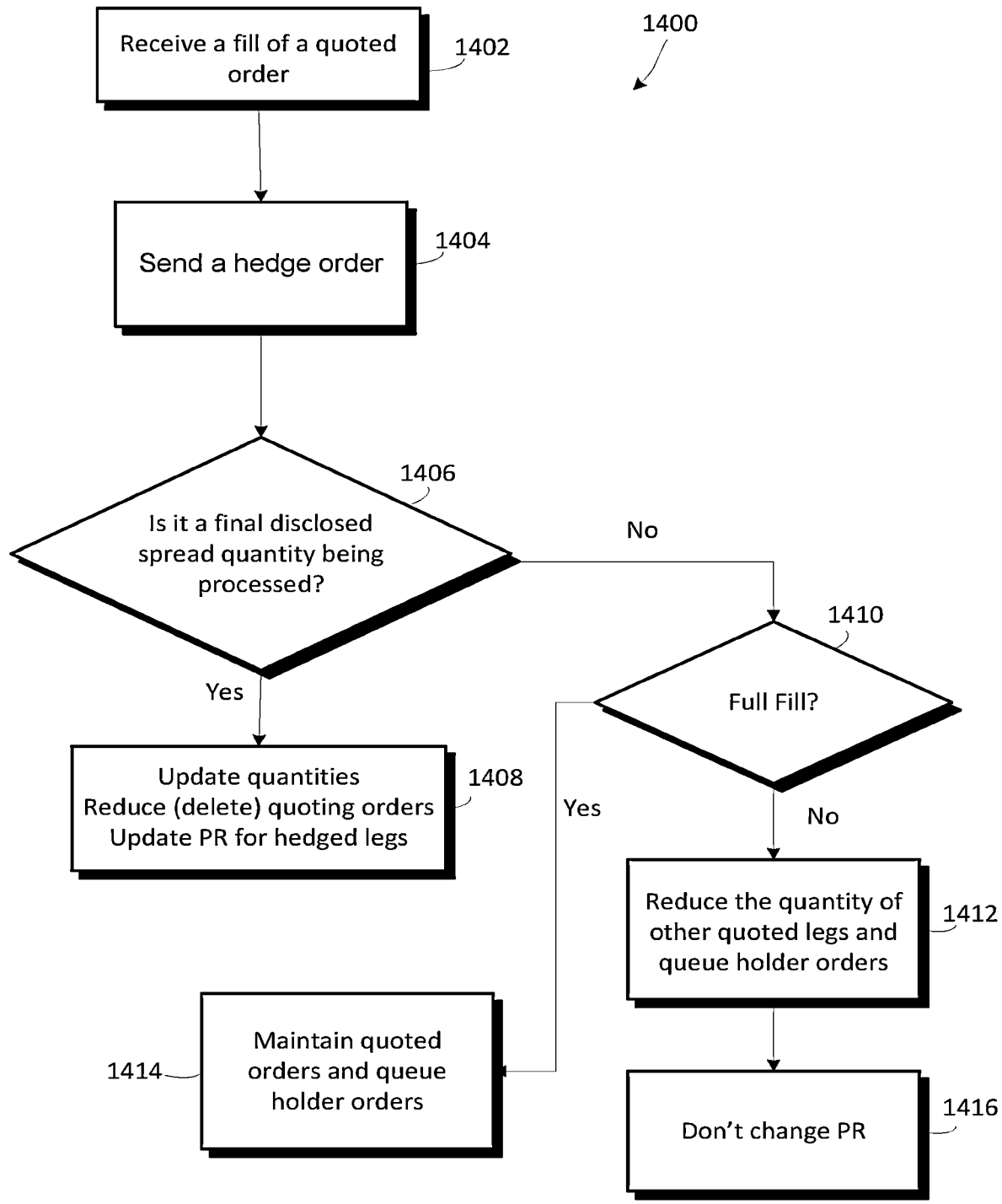
FIG. 14 is a flowchart illustrating an example method for processing a fill of a quoting order according to an example embodiment.

FIG. 14 is a flowchart 1400 illustrating a method for processing a fill of a quoting order according to an example embodiment.

At step 1402, a fill is received from an electronic exchange for an order that was quoted in relation to a tradeable object associated with a trading strategy, such as a spread strategy. Upon receiving the fill, at step 1404, a hedge order is sent. According to one example embodiment, a single hedge order may be sent if a trading strategy involves trading two tradeable objects. However, it should be understood that more than one hedge order could be sent in relation to a trading strategy that includes more than two tradeable objects.

At step 1406, it is determined if the fill of the quoted order and the hedge order are associated with the final disclosed quantity being processed in relation to the trading strategy. If so, at step 1408, various order quantities may be updated. For example, if an order fill is a partial fill, the quantities of any other quoting orders may be reduced in accordance with any hedge quantity that was sent. Additionally, other quoting orders may be deleted if a full fill is detected in relation to the quoted order. Further, a position reserve quantity may be updated for each hedged leg.

Referring back to step 1406, if it is determined that the final disclosed quantity is not being processed in relation to the trading strategy, at step 1410, it is determined if the received fill is a full fill. If not, at step 1412, the quantity of other quoted legs, as well as queue holder order, if used, may be reduced accordingly. Additionally, the position reserve quantities are not modified. As mentioned earlier, according to an example embodiment, the position reserve quantities may be modified upon placing additional disclosed quoting orders rather than when a quoting order gets filled. Then, if the full fill is received, at step 1414, the queue holder orders, if used, may be maintained for any future quoted orders in the leg, and other quoted orders are also maintained in the market.

Figure 15:
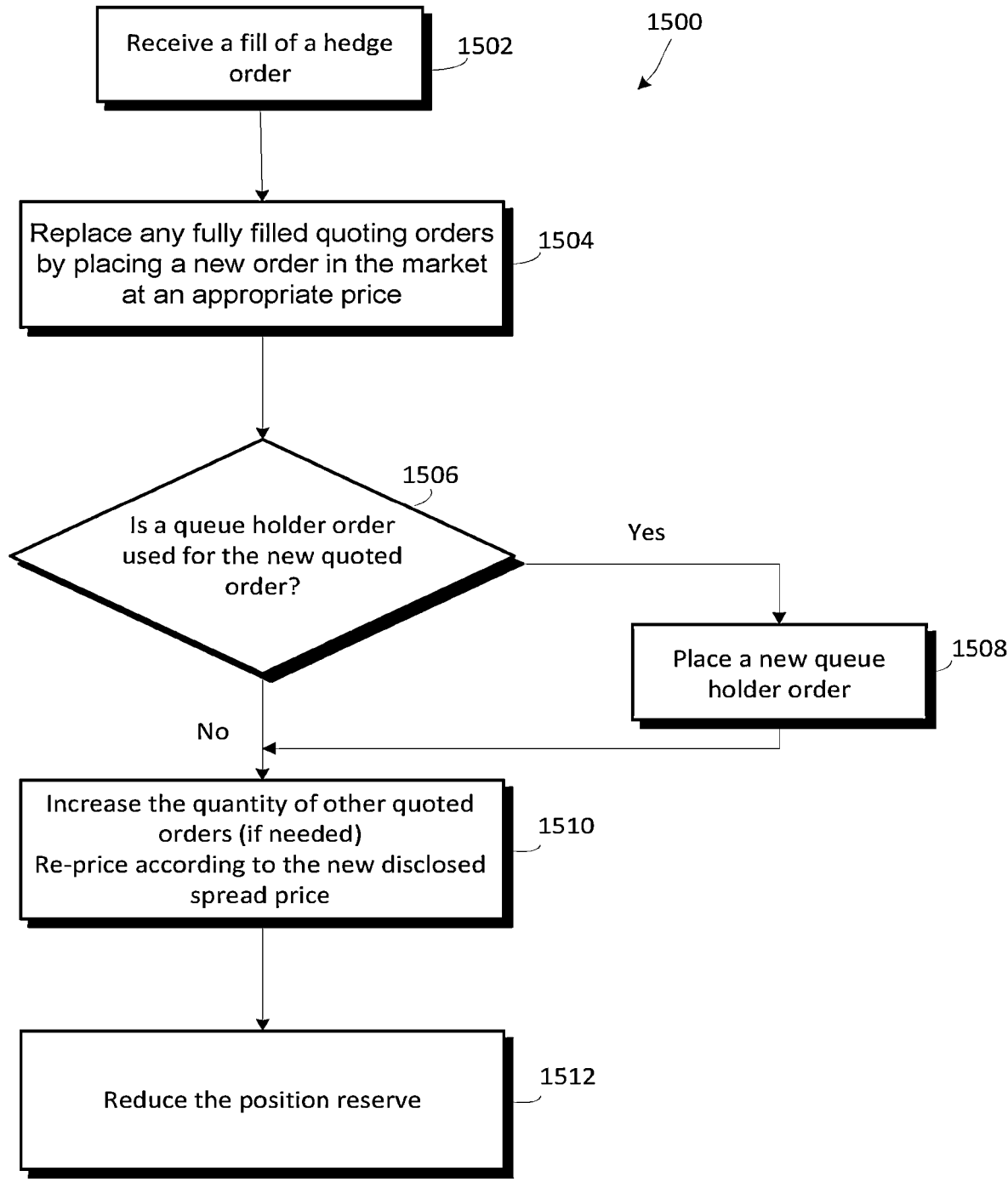
FIG. 15 is a flowchart illustrating an example method for processing a fill of a hedge order.

FIG. 15 is a flow diagram illustrating an example method 1500 for processing a fill of a hedge order.

At step 1502, a fill is received for a hedge order. At step 1504, a new quoting order is submitted at an appropriate price. The price of the new quoting order is based on a new disclosed spread price and the lean on prices.

As mentioned earlier, queue holder orders may be used in relation to quoting orders. In such an embodiment, at step 1506, it is determined if a queue holder order was used for the new quoted order. If so, at step 1508, a new queue holder order is submitted to maintain a desired number of queue holder orders pending in the market. It should be understood that if the new quoting order is submitted at a price of the second queue holder order, more than one queue holder order could be added to maintain the desired number of queue holder orders. At step 1510, if the quantities of orders quoted in other legs of the spread were reduced prior to receiving the fill of the hedge order, such as based on the partial fills, etc., the quantities of other quoted orders may be adjusted based on the new disclosed spread quantity and the spread configuration, such as the spread ratio. Additionally, as shown at step 1510, the quoted orders in the other legs of the spread may be re-priced according to the new disclosed spread price and current market conditions of the leaned-on legs.

At step 1512, the position reserve quantities are reduced according to the example methods described above.

One or more of the steps of the methods discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A non-transitory computer readable medium having stored therein instructions executable by a processor, including instructions executable to:

receive a price modifier parameter and a quantity modifier parameter to be applied to a spread order along with a definition for the spread order defined between at least a first tradeable object and a second tradeable object, wherein the received definition for the spread order comprising a first parameter defining a desired spread price and a second parameter defining a desired spread quantity, and wherein the gateway communicates over a computer network with an electronic exchange;

apply the quantity modifier parameter to the desired spread quantity to apportion the spread order into two or more spread orders and the price modifier parameter to the desired spread price to determine a range of desired spread prices for the two or more spread orders, wherein the two or more spread orders includes a first disclosed spread order and a second disclosed spread order, the first disclosed spread order associated with a first disclosed desired spread price determined by the spread modifier application based on the price modifier parameter, and further being associated with a first disclosed spread quantity determined by the spread modifier application based on the quantity modifier parameter, and the second disclosed spread order associated with a second disclosed desired spread price determined by the spread modifier application based on the price modifier parameter, and further being associated with a second disclosed spread quantity determined by the spread modifier application based on the quantity modifier parameter, wherein the second disclosed spread order is not initiated until a first trigger to initiate the second disclosed spread order is detected;

determine a first price and a first quantity for the first tradeable object based on the first disclosed spread order, the first price being determined by the spread trading application based on the first disclosed desired spread price and market conditions in the second tradeable object, and the first quantity being determined by the spread trading application based on the first disclosed spread quantity and the definition for the spread order;

send a first order message comprising a first order to buy or sell the first quantity of the first tradeable object of the spread trading strategy to the electronic exchange, the first order message comprising the first quantity and the first price for the first order;

detect subsequent to sending the first order message the first trigger to initiate the second disclosed spread order;

determine subsequent to detecting the first trigger, a second price and a second quantity for the first tradeable object based on the second disclosed spread order, the second price being determined by the spread trading application based on the second disclosed desired spread price and market conditions in the second tradeable object, and the second quantity being determined by the spread trading application based on the second disclosed spread quantity and the definition for the spread order; and send subsequent to determining the second price and the second quantity for the first tradeable object, a second order message comprising a second order to buy or sell the second quantity of the first tradeable object of the spread trading strategy to the electronic exchange, the second order message comprising the second quantity and the second price for the second order.

2. The non-transitory computer readable medium of claim 1, wherein detecting the first trigger includes detecting that the first disclosed spread order was executed.

3. The non-transitory computer readable medium of claim 1, wherein the preset value for the price modifier comprises at least one offset value.

4. The non-transitory computer readable medium of claim 3, wherein the at least one offset value is a number.

5. The non-transitory computer readable medium of claim 1, wherein the preset value for the quantity modifier comprises a fractional value.

6. The non-transitory computer readable medium of claim 1, further including instructions executable to:

determine a third price and a third quantity for the second tradeable object based on the first disclosed spread order, the third price being determined by the spread trading application based on the first disclosed desired spread price and market conditions in the first tradeable object, and the third quantity being determined by the spread trading application based on the first disclosed spread quantity and the definition for the spread order; and send when the first order message is sent, a third order message comprising a third order to buy or sell the third quantity of the second tradeable object of the spread trading strategy, the third order comprising the third quantity and the third price for the third order.

7. The non-transitory computer readable medium of claim 6, further including instructions executable to:
re-price upon detecting a second trigger, the third order based on the second disclosed desired spread price.

8. The non-transitory computer readable medium of claim 7, wherein the second trigger is detected upon detecting a fill of the first order and before sending a hedge order for the second tradeable object.

9. The non-transitory computer readable medium of claim 7, wherein the second trigger is detected upon detecting a fill of the first order and after sending a hedge order for the second tradeable object.

10. The non-transitory computer readable medium of claim 7, wherein the second trigger is detected upon detecting a fill of the first order and after detecting a fill of a hedge order that is sent for the second tradeable object.

11. A system comprising:
a computing device including a memory and a processor, the memory storing instructions executable by a processor, including instructions executable to:
receive a price modifier parameter and a quantity modifier parameter to be applied to a spread order along with a definition for the spread order defined between at least a first tradeable object and a second tradeable object, wherein the received definition for the spread order comprising a first parameter defining a desired spread price and a second parameter defining a desired spread quantity, and wherein the gateway communicates over a computer network with an electronic exchange;
apply the quantity modifier parameter to the desired spread quantity to apportion the spread order into two or more spread orders and the price modifier parameter to the desired spread price to determine a range of desired spread prices for the two or more spread orders, wherein the two or more spread orders includes a first disclosed spread order and a second disclosed spread order, the first disclosed spread order associated with a first disclosed desired spread price determined by the spread modifier application based on the price modifier parameter, and further being associated with a first disclosed spread quantity determined by the spread modifier application based on the quantity modifier parameter, and the second disclosed spread order associated with a second disclosed desired spread price determined by the spread modifier application based on the price modifier parameter, and further being associated with a second disclosed spread quantity determined by the spread modifier application based on the quantity modifier parameter, wherein the second disclosed spread order is not initiated until a first trigger to initiate the second disclosed spread order is detected;
determine a first price and a first quantity for the first tradeable object based on the first disclosed spread order, the first price being determined by the spread trading application based on the first disclosed desired spread price and market conditions in the second tradeable object, and the first quantity being determined by the spread trading application based on the first disclosed spread quantity and the definition for the spread order;
send a first order message comprising a first order to buy or sell the first quantity of the first tradeable object of the spread trading strategy to the electronic exchange, the first order message comprising the first quantity and the first price for the first order;
detect subsequent to sending the first order message the first trigger to initiate the second disclosed spread order;
determine subsequent to detecting the first trigger, a second price and a second quantity for the first tradeable object based on the second disclosed spread order, the second price being determined by the spread trading application based on the second disclosed desired spread price and market conditions in the second tradeable object, and the second quantity being determined by the spread trading application based on the second disclosed spread quantity and the definition for the spread order; and
send subsequent to determining the second price and the second quantity for the first tradeable object, a second order message comprising a second order to buy or sell the second quantity of the first tradeable object of the spread trading strategy to the electronic exchange, the second order message comprising the second quantity and the second price for the second order.

12. The system of claim 11, wherein detecting the first trigger includes detecting that the first disclosed spread order was executed.

13. The system of claim 11, wherein the preset value for the price modifier comprises at least one offset value.

14. The system of claim 13, wherein the at least one offset value is a number.

15. The system of claim 11, wherein the preset value for the quantity modifier comprises a fractional value.

16. The system of claim 11, further including instructions executable to:
determine a third price and a third quantity for the second tradeable object based on the first disclosed spread order, the third price being determined by the spread trading application based on the first disclosed desired spread price and market conditions in the first tradeable object, and the third quantity being determined by the spread trading application based on the first disclosed spread quantity and the definition for the spread order; and
send when the first order message is sent, a third order message comprising a third order to buy or sell the third quantity of the second tradeable object of the spread trading strategy, the third order comprising the third quantity and the third price for the third order.

17. The system of claim 16, further including instructions executable to:
re-price upon detecting a second trigger, the third order based on the second disclosed desired spread price.

18. The system of claim 17, wherein the second trigger is detected upon detecting a fill of the first order and before sending a hedge order for the second tradeable object.

19. The system of claim 17, wherein the second trigger is detected upon detecting a fill of the first order and after sending a hedge order for the second tradeable object.

20. The system of claim 17, wherein the second trigger is detected upon detecting a fill of the first order and after detecting a fill of a hedge order that is sent for the second tradeable object.

* * * * *